(12) United States Patent
Mochizuki et al.

(10) Patent No.: US 6,172,958 B1
(45) Date of Patent: Jan. 9, 2001

(54) OPTICAL PICK-UP AND DISK PLAYER

(75) Inventors: Tsutomu Mochizuki, Chiba; Yutaka Sugawara, Tokyo, both of (JP)

(73) Assignee: Sony Corporation, Tokyo (JP)

( * ) Notice: Under 35 U.S.C. 154(b), the term of this patent shall be extended for 0 days.

(21) Appl. No.: 09/043,002

(22) PCT Filed: May 9, 1997

(86) PCT No.: PCT/JP97/01572

§ 371 Date: Jan. 9, 1998

§ 102(e) Date: Jan. 9, 1998

(87) PCT Pub. No.: WO97/42631

PCT Pub. Date: Nov. 13, 1997

(30) Foreign Application Priority Data

May 9, 1996 (JP) ..................................................... 8-139423
Jun. 14, 1996 (JP) ..................................................... 8-153934

(51) Int. Cl.⁷ ....................................................... G11B 7/12
(52) U.S. Cl. ...................... 369/112; 369/44.37; 369/44.17
(58) Field of Search ............................ 369/58, 112, 110, 369/111, 44.37, 44.38, 44.14, 44.15, 44.12, 47, 44.19, 44.17, 44.16, 54, 116

(56) References Cited

FOREIGN PATENT DOCUMENTS

| | | |
|---|---|---|
| 0 470 807 | 2/1992 | (EP) . |
| 0 610 055 | 8/1994 | (EP) . |
| 0 742 552 | 11/1996 | (EP) . |
| 61-177652 * | 8/1986 | (JP) . |
| 63-304437 * | 12/1988 | (JP) . |
| 1-64114 * | 4/1989 | (JP) . |
| 3-88129 * | 4/1991 | (JP) . |
| 4-62512 * | 5/1992 | (JP) . |
| 4-205821 * | 7/1992 | (JP) . |
| 6-168472 * | 6/1994 | (JP) . |
| 7-354198 * | 12/1995 | (JP) . |
| 8-315408 * | 11/1996 | (JP) . |
| 8-329517 * | 12/1996 | (JP) . |
| 09-7206 * | 1/1997 | (JP) . |
| 9-237428 * | 9/1997 | (JP) . |

* cited by examiner

Primary Examiner—Muhammad Edun
(74) Attorney, Agent, or Firm—Ronald P. Kananen; Rader, Fishman & Grauer

(57) ABSTRACT

In order to provide an optical pick-up capable of carrying out write and read operations of information signals with respect to plural kinds of optical discs in which thicknesses of transparent bases are different from each other and simple in configuration, a first object lens 7a for converging light beams from a first light source onto an optical disc 101 of the first kind and a second object lens 7b for converging light beams from a second light source 6 onto an optical disc 102 of the second kind are provided on the same lens bobbin 8. The lens bobbin 8 is movably supported by the columnar support shaft and is caused to undergo movement operation by magnetic circuit.

21 Claims, 19 Drawing Sheets

OPTICAL PICK-UP AND DISK PLAYER

TECHNICAL FIELD

This invention belongs to the technical field relating to an optical pick-up adapted for carrying out write and read operations of information signals with respect to disc-shaped optical recording media such as optical disc or magneto-optical disc, and a disc player caused to be of structure comprising such optical pick-up and adapted for carrying out recording and reproduction of information signals with respect to disc-shaped recording media as described above.

BACKGROUND ART

Hitherto, as a recording medium for information signals, disc-shaped optical recording media such as optical disc or magneto-optical disc have been proposed. Further, optical pick-up devices for carrying out write and read operations of information signals with respect to such disc-shaped optical recording media have been proposed. In addition, disc players caused to be of structure comprising such optical pick-up and adapted for carrying out recording and reproduction of information signals with respect to disc-shaped optical recording media as described above have been proposed.

Such a disc-shaped optical recording medium is caused to be of structure including a transparent base (substrate) consisting of transparent material such as polycarbonate, and a signal recording layer deposited and formed on one principal surface portion of the transparent base. The optical pick-up is caused to be of structure including a semiconductor laser serving as a light source, an object lens (objective) to which light beams emitted from the semiconductor laser are incident, and a photo-detector.

The light beams incident to the object lens are irradiated, in converged state, onto the signal recording surface of the disc-shaped optical recording medium by the object lens. In this case, these light beams are irradiated from the transparent base (substrate) side of the disc-shaped optical recording medium onto the disc-shaped optical recording medium, and are converged onto the signal recording surface which is the surface portion of the signal recording layer after transmitted through the transparent base. This object lens is caused to undergo movement operation in the state supported by the bi-axial actuator to thereby converge the light beams onto the portion where information signal is recorded on the signal recording surface, i.e., a predetermined recording track. Such recording tracks are formed so as to take spiral shape on the principal surface portion of the disc-shaped optical recording medium.

In the disc-shaped optical recording medium, light beams are irradiated in the state converged after passed through the object lens, whereby write or read operation of information signal is carried out at the portion to which such light beams has been converged.

The light beam converged on the signal recording surface is caused to undergo modulation in light quantity or light polarization direction in dependency upon the information signal recorded on the signal recording surface and is reflected by the signal recording surface. The reflected light thus obtained returns to the object lens.

The reflected light beam reflected by the signal recording surface is received by the photo-detector after passed through the object lens. This photo-detector is a light receiving element such as photo-diode, and serves to receive the reflected light beam which has been passed through the object lens to convert it into an electric signal. On the basis of the electric signal outputted from the photo-detector, reproduction of information signal recorded on the disc-shaped optical recording medium is carried out.

Moreover, on the basis of the electric signal outputted from the photo-detector, a focus error signal indicating distance in the optical axis direction of the object lens between the focal point of the light beam by the object lens and the signal recording surface, and a tracking error signal indicating distance in the radial direction of the disc-shaped optical recording medium between the focal point and the recording track on the signal recording surface are generated. The biaxial actuator is controlled on the basis of the focus error signal and the tracking error signal to allow the object lens to undergo movement operation so that these respective error signals are converged into zero (0).

Meanwhile, since such a disc-shaped optical recording medium is used as an auxiliary memory (unit) for computer and/or recording medium for speech and picture signals, recording density of information signals is being caused to be high.

In order to carry out write and read operations of information signals with respect to the disc-shaped optical recording medium of which recording density has been caused to be high, it is necessary to allow the object lens to have greater numerical aperture (NA), and to allow the wavelength of light emitted of the light source to be shorter to reduce (diameter of) beam spot formed as the result of the fact that the light beams are converged onto the disc-shaped optical recording medium.

However, when the numerical aperture of the object lens becomes greater, respective degrees of allowance of inclination of the disc-shaped optical recording medium, variations (unevenness) in thickness of the transparent base of the disc-shaped optical recording medium, and defocus (deviation in focal point) of the light beams on the disc-shaped optical recording medium are reduced. As a result, write and read operations of information signals with respect to the disc-shaped optical recording medium become difficult.

For example, when inclination (skew) with respect to the optical axis of the object lens of the disc-shaped optical recording medium takes place, wave front aberration in the light beam converged on the signal recording surface takes place, so electric signal (RF output) outputted from the photo-detector is affected.

In this wave front aberration, coma-aberration of the third order (cubic coma-aberration) produced in proportion to the third power of the numerical aperture of the object lens and approximately the first power of inclination angle (skew angle) of the disc-shaped optical medium is dominant. Accordingly, the allowed value with respect to the inclination of the disc-shaped optical recording medium is inversely proportional to third power of the numerical aperture of the object lens. Namely, when the numerical aperture becomes great, the allowed value becomes small.

In optical discs (disc like the so-called "compact discs") caused to be of structure including a disc-shaped transparent base (substrate) having thickness of 1.2 mm and diameter of 80 mm or 120 mm and formed by polycarbonate, and widely used in general at present, there are instances where inclination of ±0.5° to ±1° takes place.

When the numerical aperture (NA) of the object lens is increased in such a optical disc, wave front aberration as described above takes place in light beams irradiated onto the optical disc. As a result, beam spot on the optical disc takes asymmetrical form, and interference between codes remarkably takes place. Thus, precise signal reproduction becomes difficult.

The quantity of such cubic coma-aberration is proportional to the thickness of the transparent base (substrate) of the optical disc. For this reason, the thickness of the transparent base is thinned (e.g., is caused to be 0.6 mm), thereby making it possible to reduce the cubic coma-aberration to one half. In the case where it is assumed that coma-aberration is caused to be decreased in this way, optical discs including the transparent base having thickness of 1.2 mm and optical discs including the transparent base having thickness of 0.6 mm would be used in mixed state as the above-mentioned optical disc.

Meanwhile, when plane parallel plate having thickness t is inserted into an optical path of a converged light beam converged by the object lens, there takes place spherical aberration proportional to $t \times (NA)^4$ in relation to the thickness t and numerical aperture NA of the object lens.

The object lens is designed so that this spherical aberration is corrected. Namely, since quantity of the spherical aberration produced also varies when the thickness of the transparent base changes, the object lens is designated as an object lens caused to be in conformity with the thickness of a predetermined transparent base.

Further, in the case where an attempt is made such that, e.g., object lens designed so as to become in conformity with an optical disc including a transparent base having thickness of 0.6 mm is used to carry out recording and reproduction of information signals with respect to optical disc including transparent base having thickness of 1.2 mm (e.g., "compact disc", write once type optical disc, or magneto-optical disc), such difference of thickness between these transparent bases (0.6 mm) would be greatly beyond the allowed range of error of thickness of the transparent base with which the optical pick-up can cope. In this case, the object lens cannot correct spherical aberration taking place resulting from difference of thickness of the transparent base, thus failing to carry out satisfactory recording and reproduction of information signals.

For this reason, an optical pick-up provided with two object lenses is conventionally proposed as disclosed in the Japanese Patent Application No. 354198/1995. As shown in FIG. 29, this optical pick-up is caused of the structure in which a first object lens 105 and a second object lens 106 are attached on a single lens bobbin 104 of a biaxial actuator 103. In this optical pick-up, light beams emitted from a light source 107 are incident to any one of the first and second object lens 105, 106 through a collimator lens 111 and a mirror 112. The first and second object lenses 105, 106 have numerical aperture values different from each other. Further, the biaxial actuator 103 is disposed on an optical system block 108 within which the light source 107 is included.

In the disc player caused to be of the structure including this optical pick-up, an optical disc 101 of the first kind in which the thickness of the transparent base is, e.g., 0.6 mm, or an optical disc 102 of the second kind in which the thickness of the transparent base is, e.g., 1.2 mm is held by the disc table of which central portion is attached to the drive shaft of spindle motor (not shown), and is caused to undergo rotational operation. Further, the optical pick-up is supported so that it is permitted to undergo movement operation in the axial direction of a guide shaft 109 as indicated by arrow S in FIG. 29 by the guide shaft 109. This optical pick-up is caused to undergo movement operation in the radial direction of the optical disc 101 or 102 held on the disc table.

In this optical pick-up, when the optical disc 101 of the first kind is loaded on the disc table, the light source 107 is caused to be turned ON to carry out write and read operations of information signals with respect to the optical disc 101 of the first kind through the first object lens 105. On the other hand, when the optical disc 102 of the second kind is loaded on the disc table, the light source 107 is caused to be turned ON to carry out write and read operations of information signals with respect to the optical disc 102 of the second kind through the second object lens 106. Switching between the first and second object lenses 105, 106 on the optical path of light beams from the light source 107 is carried out by rotating the lens bobbin 104 about a support shaft 110 which supports this lens bobbin 104.

Further, the lens bobbin 104 of the biaxial actuator 103 is caused to undergo rotational operation about the support shaft 110 to thereby allow the respective object lenses 105, 106 to undergo movement operation in the tracking direction which is the direction substantially in parallel to the axial direction of the guide shaft 109 as indicated by arrow T in FIG. 29 to allow these object lenses 105, 106 to follow the recording tracks on the optical discs 101, 102.

However, in the write once type optical disc (so called "CD-R") including a transparent base having thickness of 1.2 mm, wavelength dependency at the time of read operation of information signals is high. For this reason, in the case where there is used light source of which wavelength of light emitted is caused to be short in order to allow the recording density of information signal to be high, read-out operation of information signals is impossible. Namely, the signal recording layer of the so-called "CD-R" is formed by material of organic pigment (coloring matter) system. For this reason, this signal recording layer absorbs light beams of which wavelength is caused to be short, e.g., light beams having wavelength of 635 nm to 650 nm so that the reflection factor is lowered. Accordingly, it is impossible to carry out read (read-out) operation of information signals by such light beams of which wavelength is caused to be short.

Accordingly, this invention has been proposed in view of the above-described actual circumstances, and its object is to provide an optical pick-up including two object lenses so that write and read operations of information signals can be satisfactorily carried out with respect to disc-shaped optical recording media in which thicknesses of their transparent bases are different from each other, wherein even in the case where either one of object lens is used, the optical pick-up is capable of carrying out satisfactory detection of information signals, and can be used also with respect to disc-shaped optical recording media in which wavelength dependency at the time of read operation of information signals is high.

In addition, another object of this invention is to provide a disc player which is provided with optical pick-up featured above, and which is capable of carrying out recording and reproduction of information signals with respect to disc-shaped optical recording media in which thicknesses of their transparent bases are different from each other, and is capable of using so far as disc-shaped optical recording media in which wavelength dependency at the time of read operation of information signals is high.

DISCLOSURE OF THE INVENTION

To solve the above-described problems, an optical pick-up according to this invention comprises: a biaxial actuator for supporting first and second object lenses on the same movable portion in the state where optical axes of these object lenses are caused to be in parallel to each other, and for allowing the movable portion to undergo movement operation to thereby move these respective object lenses in an optical axis direction of each object lens and in a direction perpendicular to the optical axis; a first light source for allowing light beams to be incident to the first object lens via a first optical path; and a second light source for allowing light beams to be incident to the second object lens via a second optical path to irradiate light beams emitted from the first light source onto a signal recording layer of a disc-shaped optical recording medium in a direction substantially perpendicular thereto to converge them on the signal recording layer by the first object lens, or to irradiate light beams emitted from the second light source onto the signal recording layer of the disc-shaped optical recording medium in the direction substantially perpendicular thereto to converge them on the signal recording layer by the second object lens, thus to carry out write or read operation of information signals with respect to the disc-shaped optical recording medium.

Namely, in the optical pick-up according to this invention, the first and second object lenses supported on the same movable portion by the biaxial actuator are adapted so that light beams emitted from the first and second light sources are caused to be correspondingly incident thereto to irradiate these respective light beams onto the signal recording layer of the disc-shaped optical recording medium in the direction substantially perpendicular thereto to converge them on the signal recording layer to carry out write or read operation of information signals with respect to the disc-shaped optical recording medium.

Namely, this invention can provide the optical pick-up adapted to have ability of satisfactorily carrying out recording and reproduction of information signals even with respect to disc-shaped optical recording media in which thicknesses of transparent bases (substrates) are different from each other without allowing the device configuration to be complicated and enlarged.

Further, an optical pick-up according to this invention comprises: a movable portion having a hearing hole through which a columnar support shaft is inserted, the movable portion being such that the support shaft is inserted through the bearing hole, whereby it is supported by the support shaft so that it can be moved in an axial direction of the support shaft and in a direction around the axis of the support shaft, and that a drive coil is attached to place the drive coil within magnetic field that magnetic circuit forms, whereby when drive current is delivered to the drive coil, it is caused to undergo movement operation; first and second object lenses supported on the movable portion in the state where their optical axes are caused to be in parallel to each other, and adapted so that the movable portion is caused to undergo movement operation, whereby they are moved in an optical axis direction and in a direction perpendicular to the optical axis; a first light source for allowing light beams to be incident to the first object lens through a first optical path; and a second light source for allowing light beams having wavelength different from that of light beams emitted from the first light source to be incident to the second object lens through a second optical path, wherein the first and second object lenses are disposed on the movable portion in the state where they are located at substantially symmetrical positions with the bearing hole being as center, and are adapted so that light beams from the light sources respectively corresponding thereto are caused to be incident thereto while they remain at substantially symmetrical positions with the support shaft being as center to irradiate light beams emitted from the first light source onto a signal recording layer of the disc-shaped optical recording medium in a direction substantially perpendicular thereto to converge them on the signal recording layer by the first object lens, or to allow light beams emitted from the second light source onto the signal recording layer of the disc-shaped optical recording medium in the direction substantially perpendicular thereto to converge them on the signal recording layer by the second object lens, thus to carry out write or read operation of information signals with respect to the disc-shaped optical recording medium.

Further, in accordance with this invention, in the above-described respective optical pick-up devices, the first and second light sources are caused to have wavelengths rays of light emitted which are different from each other. In this case, the wavelength of light emitted of the first light source is 635 nm to 650 nm, and the wavelength of light emitted of the second light source is 780 nm.

Further, in accordance with this invention, in the above-described optical pick-up, numerical aperture of the first object lens is caused to be greater than numerical aperture of the second object lens. In this case, the numerical aperture of the first object lens is 0.6 and the numerical aperture of the second object lens is 0.45 or less.

Further, in accordance with this invention, the first and second object lenses are arranged in the circumferential direction of the disc-shaped optical recording medium, and are disposed in a manner close to each other in the state where one line passing through the center of the disc-shaped optical recording medium is put therebetween.

Further, in accordance with this invention, when the optical system block for supporting the biaxial actuator is caused to relatively undergo movement operation in a direction to come into contact with the central portion of the disc-shaped optical recording medium or to become away therefrom, any one of the first and second object lenses moves in the state opposite to line passing through the center of the disc-shaped optical recording medium and in parallel to relative movement direction between the optical system block and the disc-shaped optical recording medium. In this case, any one of the first and second object lenses which moves in the state opposite to line passing through the center of the disc-shaped optical recording medium and in parallel to relative movement direction between the optical system block and the disc-shaped optical recording medium when the optical block is caused to relatively undergo movement operation in a direction to come into contact with the central portion of the disc-shaped recording medium or to become away therefrom has a numerical aperture greater than that of the other object lens.

Further, in accordance with this invention, when the optical system block for supporting the biaxial actuator is caused to relatively undergo movement operation in a direction to come into contact with the central portion of the disc-shaped optical recording medium or to become away therefrom, the first and second object lenses move in the state opposite to line passing through the center of the disc-shaped recording medium and in parallel to relative movement direction between the optical system block and the disc-shaped optical recording medium. In this case, the other object lens positioned at the outer circumferential side of the disc-shaped optical recording medium relative to one of the first and second object lenses has a numerical aperture smaller than that of one object lens.

Further, in accordance with this invention, the movable portion of the biaxial actuator has bearing hole through which a columnar support shaft is inserted. By inserting the support shaft through the bearing hole, the movable portion is supported by the support shaft so that it can be moved in the axial direction of the support shaft and in the direction around the support shaft. Drive coil is attached to the movable portion in such a manner that the drive coil is positioned within magnetic field that magnetic circuit forms. By delivering drive current to the drive coil, the movable portion is caused to undergo movement operation. The first and second object lenses are disposed on the movable portion in the state where they are located at substantially symmetrical positions with the bearing hole being as center, and are adapted so that light beams from the light sources respectively corresponding thereto are caused to be incident thereto while they remain at substantially symmetrical positions with the support shaft being as center.

Further, in accordance with this invention, the movable portion of the biaxial actuator is supported by leaf springs. By displacement of the leaf spring, the movable portion can be moved. In addition, drive coil is attached to the movable portion in such a manner that the drive coil is positioned within magnetic field that magnetic circuit forms. Thus, by delivering drive current to the drive coil, the movable portion is caused to undergo movement operation.

Further, in accordance with this invention, the drive coil attached to the movable portion is comprised of at least a pair of coils. One of these coils and the magnetic circuit apply, to the movable portion, drive force in a direction to allow respective object lenses to be moved in the optical axis direction. In addition, the other of these coils and the magnetic circuit apply, to the movable portion, drive force in a direction to allow the respective object lenses to be moved in a direction perpendicular to the optical axis. In this case, the pair of coils are attached to the plane in parallel to the optical axis of each object lens formed on the movable portion. The magnetic circuit comprises at least a pair of magnets.

Further, in accordance with this invention, when the optical system block for supporting the support shaft which supports the movable portion is caused to relatively undergo movement operation in a direction to come into contact with the central portion of the disc-shaped optical recording medium or to become away therefrom, the first object lens moves in the state opposite to the line passing through the center of the disc-shaped optical recording medium and in parallel to relative movement direction between the optical system block and the disc-shaped optical recording medium.

Further, a disc player according to this invention comprises: a recording medium holding mechanism for holding a disc-shaped optical recording medium including a transparent base (substrate) and a signal recording layer; a biaxial actuator adapted for supporting first and second object lenses on the same movable portion in the state where optical axes of the object lenses are caused to be in parallel to each other to allow these object lenses to be opposite to the disc-shaped optical recording medium held by the recording medium holding mechanism and to allow the movable portion to undergo movement operation to thereby move the respective object lenses in an optical axis direction of each object lens and in a direction perpendicular to the optical axis; a first light source for allowing light beams to be incident to the first object lens via a first optical path; a second light source for allowing light beams to be incident to the second object lens via a second optical path; base thickness detecting means for detecting thickness of a transparent base of the disc-shaped optical recording medium held by the recording medium holding mechanism; and control means for selecting in dependency upon detection result of the thickness of the transparent base by the base thickness detecting means whether either any of the first and second light sources is caused to emit light, whereby when the thickness of the transparent base of the disc-shaped optical recording medium held by the recording medium holding mechanism is a thickness in conformity with the first object lens, light beams emitted from the first light source are irradiated onto the signal recording layer of the disc-shaped optical recording medium in a direction substantially perpendicular thereto to converge them on the signal recording layer by the first object lens, while when the thickness of the transparent base of the disc-shaped optical recording medium held by the recording medium holding mechanism is a thickness in conformity with the second object lens, light beams emitted from the second light source are irradiated onto the signal recording layer of the disc-shaped optical recording medium in a direction substantially perpendicular thereto to converge them on the signal recording layer by the second object lens, thus to carry out write or read operation of information signals with respect to the disc-shaped optical recording medium.

Further, in accordance with this invention, in the disc player, there is provided an optical system block for supporting the biaxial actuator and adapted so that it is permitted to undergo relative movement with respect to the disc-shaped optical recording medium in a direction to come into contact with the central portion of the disc-shaped optical recording medium or to become away therefrom, whereby when the optical system block is caused to relatively undergo movement operation in the direction to come into contact with the central portion of the disc-shaped optical recording medium or to become away therefrom, the first object lens is caused to be moved in the state opposite to line passing through the center of the disc-shaped optical recording medium and in parallel to relative movement direction between the optical system block and the disc-shaped optical recording medium, and there is provided an optical diffraction element for branching light beam incident onto the first optical path into ray of the 0-th order light and rays of at least the ±1-st order light to obtain a tracking error signal indicating deviation quantity in the radial direction of the disc-shaped optical recording medium between focal point of the 0-th order light by the first object lens and (position of) the recording track on the disc-shaped optical recording medium on the basis of light quantity difference of reflected light beams from the disc-shaped optical recording medium of the ±1-st order light.

Further, in accordance with this invention, in the disc player, the wavelength of light emitted of the first light source is 635 nm to 650 nm, and the wavelength of light emitted of the second light source is 780 nm. In addition, in the above-mentioned disc player, the numerical aperture of the first object lens is 0.6 and the numerical aperture of the second object lens is 0.45 or less.

BEST MODE FOR CARRYING OUT THE INVENTION

Best mode for carrying out this invention will now be described with reference to the attached drawings in order as below.

[1] Kind of the disc-shaped optical recording medium
[2] Outline of the configuration of the optical pick-up
[3] Configuration of the biaxial actuator
[4] Configuration of the optical system block
[5] Configuration of the disc player
[6] Another form (1) of the configuration of the biaxial actuator
[7] Further form (2) of the configuration of the biaxial actuator
[8] Still further form (3) of the configuration of the biaxial actuator

[1] Kind of the disc-shaped optical recording medium

Figure 2:
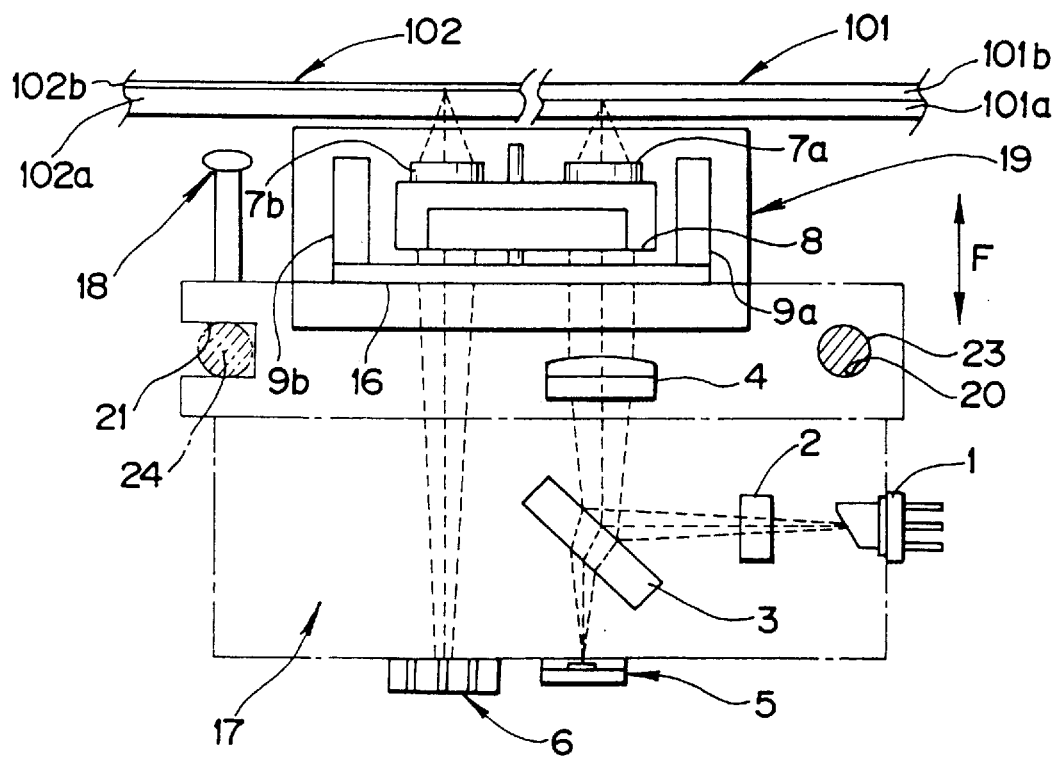
FIG. 2 is a longitudinal cross sectional view showing the configuration of the optical pick-up.

In the mode for carrying out the invention disclosed here, the optical pick-up according to this invention is constituted, as shown in FIG. 2, as a device adapted for irradiating laser beams with respect to both an optical disc 101 of the first kind which is a disc-shaped optical recording medium in which thickness of the transparent base (substrate) is 0.6 mm and an optical disc 102 of the second kind which is a disc-shaped optical recording medium in which thickness of the transparent base 102a is 1.2 mm to thereby carry out write and read operations of information signals.

It is to be noted that the optical pick-up according to this invention is not limited to an optical pick-up using optical disc which is a disc-shaped optical recording medium as described above as the optical recording medium, but may be constituted as an optical pick-up using a recording medium like the so-called optical tape or optical card.

The optical disc 101 of the first kind is caused to be of structure including the disc-shaped transparent base formed by polycarbonate having thickness of 0.6 mm and diameter of 120 mm, and signal recording layer formed on one principal surface of the transparent base. This optical disc 101 of the first kind is composed of two optical discs 101a, 101b with their signal recording layers being stuck with each other to constitute a disc body having thickness of 1.2 mm, i.e., double sided optical disc.

This optical disc 101 of the first kind is caused to be of the structure capable of carrying out write and read operations of information signals through object lens (objective) having numerical aperture (NA) of 0.6 by laser beams having wavelength of 635 nm (or 650 nm) which is the first wavelength. In the signal recording layer, information signals are recorded along recording tracks formed in a spiral form.

As optical disc which corresponds to such optical disc 101 of the first kind, e.g., the so-called "Digital Video Disc (DVD)" (trade name) has been proposed.

The optical disc 102 of the second kind is caused to be of structure including a disc-shaped transparent base 102a formed by polycarbonate having thickness of 1.2 mm and diameter of 80 mm or 120 mm, and a signal recording layer 102b formed on one principal surface portion of the transparent base 102a.

The optical disc 102 of the second kind is caused to be of the structure capable of carrying out write and read operations of information signals through object lens having numerical aperture of 0.45 by laser beams having wavelength of 780 nm which is the second wavelength. At the signal recording layer, information signals are recorded along recording tracks formed in a spiral form so as to take substantially concentrical circular shape.

As an optical disc which corresponds to such optical disc 102 of the second kind, e.g., the so-called "Compact Disc (CD)" (trade name) and the so-called "CD-ROM", "CD-R" have been proposed.

It is to be noted that, in the write once optical disc including the transparent base having thickness of 1.2 mm, which is so called "CD-R", the wavelength dependency at the time of read operation of information signals is high. For this reason, in the case where there is used light source of which wavelength of light emitted is caused to be short for the purpose of allowing the recording density of information signals to be high, read operation of information signals cannot be carried out. Namely, the signal recording layer of the so-called "CD-R" is formed by material of organic coloring matter system. For this reason, this signal recording layer absorbs light beams of which wavelength has been caused to be short, e.g., light beams having wavelength of 635 nm to 650 nm so that reflection factor is lowered. Accordingly, in the case where such light beams of which wavelength has been caused to be short is used, read operation of information signals cannot be carried out.

Figure 3:
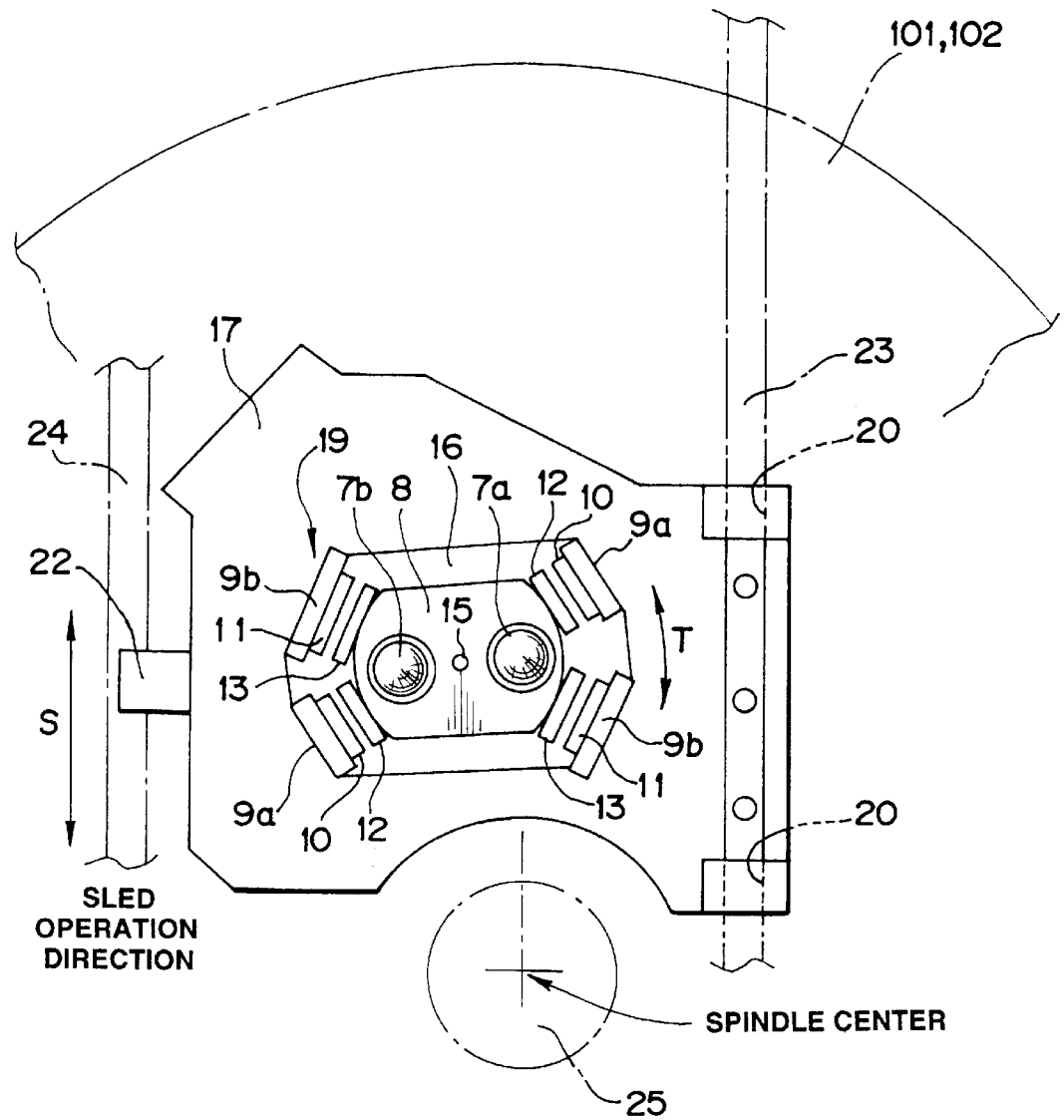
FIG. 3 is a plan view showing the configuration of the optical pick-up.
Figure 8:
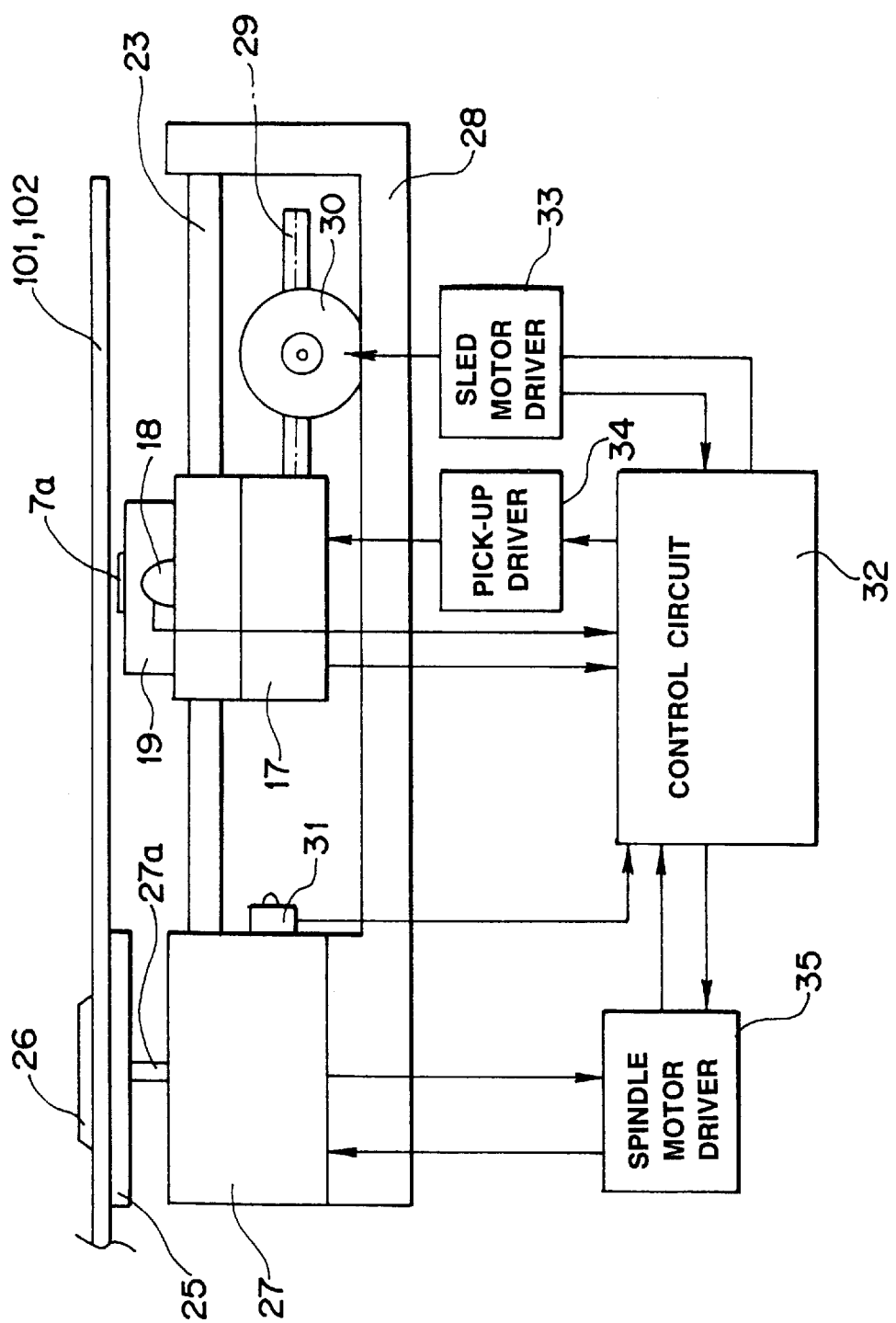
FIG. 8 is a block diagram showing the configuration of a disc player according to this invention.

These optical discs 101, 102 of the first kind and the second kind are caused to undergo rotational operation by a spindle motor 27 attached to a chassis 28, as shown in FIG. 8, in the disc player according to this invention provided with the optical pick-up according to this invention. A disc table 25 serving as a recording medium holding mechanism is attached to a drive shaft 27a of the spindle motor 27 as shown in FIGS. 3 and 8. As shown in FIG. 8, this disc table is formed so that it takes substantially disc shape, and includes a substantially circular truncated cone shaped projection 26 on the central portion of the upper surface portion thereof. This disc table 25 is constituted so that when the central portion of each optical disc 101 or 102 is mounted thereon, the central portion of the optical disc 101 or 102 is held in a manner to fit the projection 26 into chucking hole provided at the central portion of the optical disc 101 or 102. Namely, each of the optical discs 101 and 102 is held on the disc table 25, and is caused to undergo rotational operation along with the disc table 25 by the spindle motor 27.

[2] Outline of the configuration of the optical pick-up

The optical pick-up according to this invention is caused to be of the structure including, as shown in FIGS. 3 and 8, an optical system block 17 supported by a guide shaft 23 and a support shaft 24 disposed on the chassis 28 so that it can be moved. The guide shaft 23 and the support shaft 24 are disposed in the state where they are caused to be in parallel to each other and are caused to be in parallel to the upper surface portion of the disc table 25.

Figure 1:
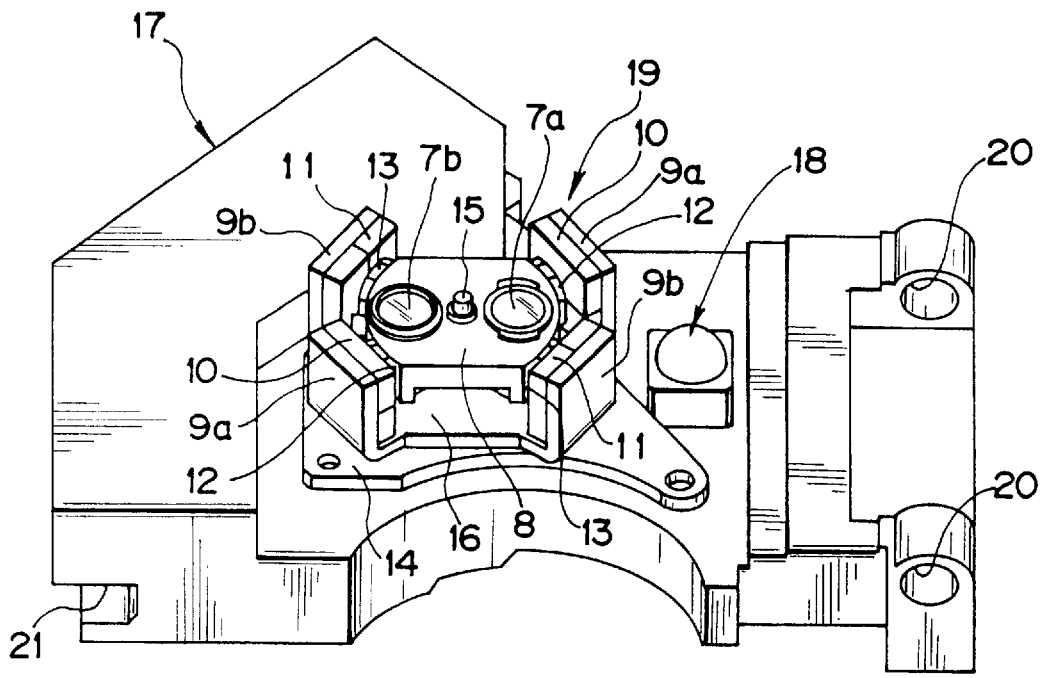
FIG. 1 is a perspective view showing the configuration of an optical pick-up according to this invention.

The optical system block 17 includes, as shown in FIGS. 1 and 2, guide holes 20, 20 through which the guide shaft 23 is inserted, and a support groove 21 into which the support shaft 24 is inserted. This optical system block 17 is caused to undergo movement operation along the guide shaft 23 and the support shaft 24, whereby it is moved in the direction to come into contact with the spindle motor 27 or to become away therefrom, i.e., in the radial direction of each of the optical discs 101 and 102 in the state where the upper surface portion is opposed to the principal surface portion of each of the optical discs 101 and 102 loaded on the disc table 25. As shown in FIG. 8, this optical system block 17 is caused to undergo movement operation through a rack gear 29 by a sled motor 30 disposed on the chassis 28.

It is to be noted that, while with respect to the positional relationship between the optical system block 17 and the spindle motor 27, i.e., the positional relationship between the optical system block 17 and the optical disc 101 or 102, there may be employed, as stated above, the configuration in which the spindle motor 27 is fixed and the optical system block 17 is caused to undergo movement operation, there may be employed, in a manner opposite to the above, a configuration (modification) such that the optical system block 17 is fixed and the spindle motor 27 is caused to undergo movement operation. In addition, there may be employed a configuration (modification) such that both the optical system block 17 and the spindle motor 27 are caused to respectively undergo movement operation.

[3] Configuration of the biaxial actuator

Meanwhile, the transparent bases of the optical discs 101, 102 are formed in a flat plate form, but there are instances where slight deformation may take place. For this reason, when such optical disc is caused to undergo rotational operation in the state where the central portion thereof is held by the disc table 25, the transparent base may experience the so-called plane vibration. Namely, when the optical disc 101 or 102 is caused to undergo rotational operation in the state where the central portion thereof is held, the signal recording layer of each optical disc 101 or 102 periodically moves in the direction to come into contact with the optical pick-up or to become away therefrom. Moreover, recording tracks of each optical disc 101, 102 are formed so that the center of curvature is in correspondence with the center of the transparent base (substrate), but there are instances where they are subject to eccentricity to a slight degree. For this reason, when the transparent base is caused to undergo rotational operation in the state where the central portion thereof is held, those recording tracks periodically move in the radial direction of each optical disc 101, 102.

In order to follow laser beams for carrying out write and read operations of information signals with respect to these optical discs 101, 102 even if movement of recording tracks by plane vibration or eccentricity of such optical discs 101, 102 takes place, the optical pick-up according to this invention is provided with a biaxial actuator 19 as shown in FIGS. 1 and 2. This biaxial actuator 19 is attached to the upper surface portion of the optical system block 17.

The biaxial actuator -19 supports the first and second object lenses 7a, 7b so that they are permitted to undergo movement operation in the optical axis direction of the respective object lenses 7a, 7b, i.e., in the focus direction indicated by arrow F in FIG. 2 and in the direction perpendicular to the optical axis, i.e., in the tracking direction indicated by arrow T in FIG. 3. These object lenses 7a, 7b are opposed to the signal recording layer of each of the optical discs 101, 102 loaded on the disc table 25, and the optical system block 17 is caused to undergo movement operation along the guide shaft 23 and the support shaft 24, whereby the object lens 7a, 7b are caused to undergo movement operation along the inner and outer circumferential directions of each of the optical discs 101, 102 as indicated by arrow S in FIG. 3. The first and second object lenses 7a, 7b are arranged in the direction substantially perpendicular to the length direction of the guide shaft 23, i.e., in the circumferential direction of each of the optical discs 101, 102 loaded on the disc table 25.

Figure 6:
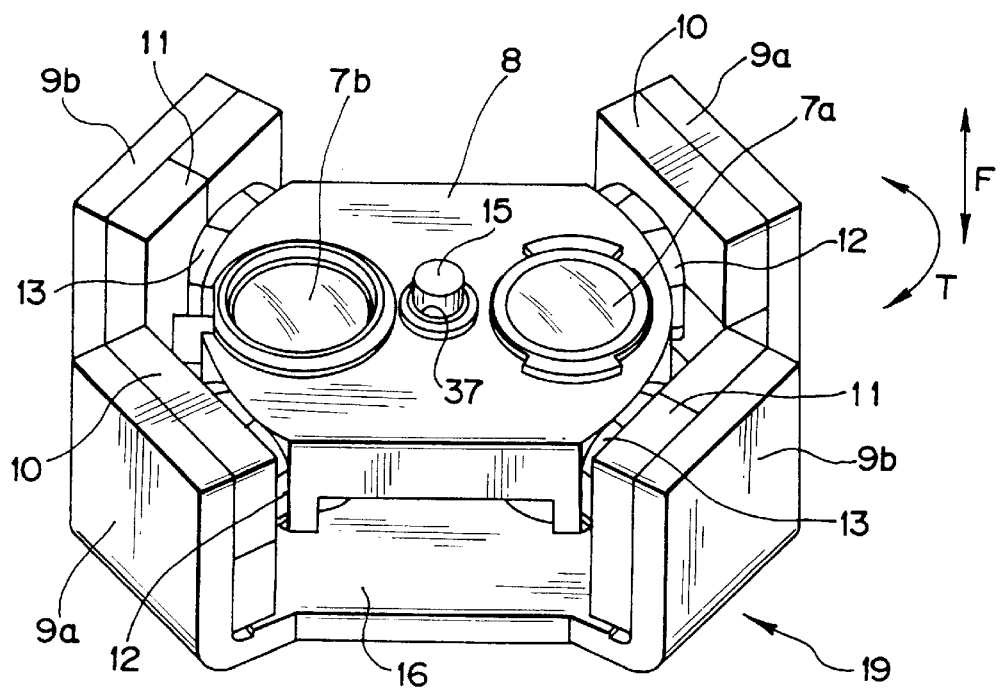
FIG. 6 is a perspective view showing the configuration of biaxial actuator serving as the essential part of the optical pick-up.
Figure 7:
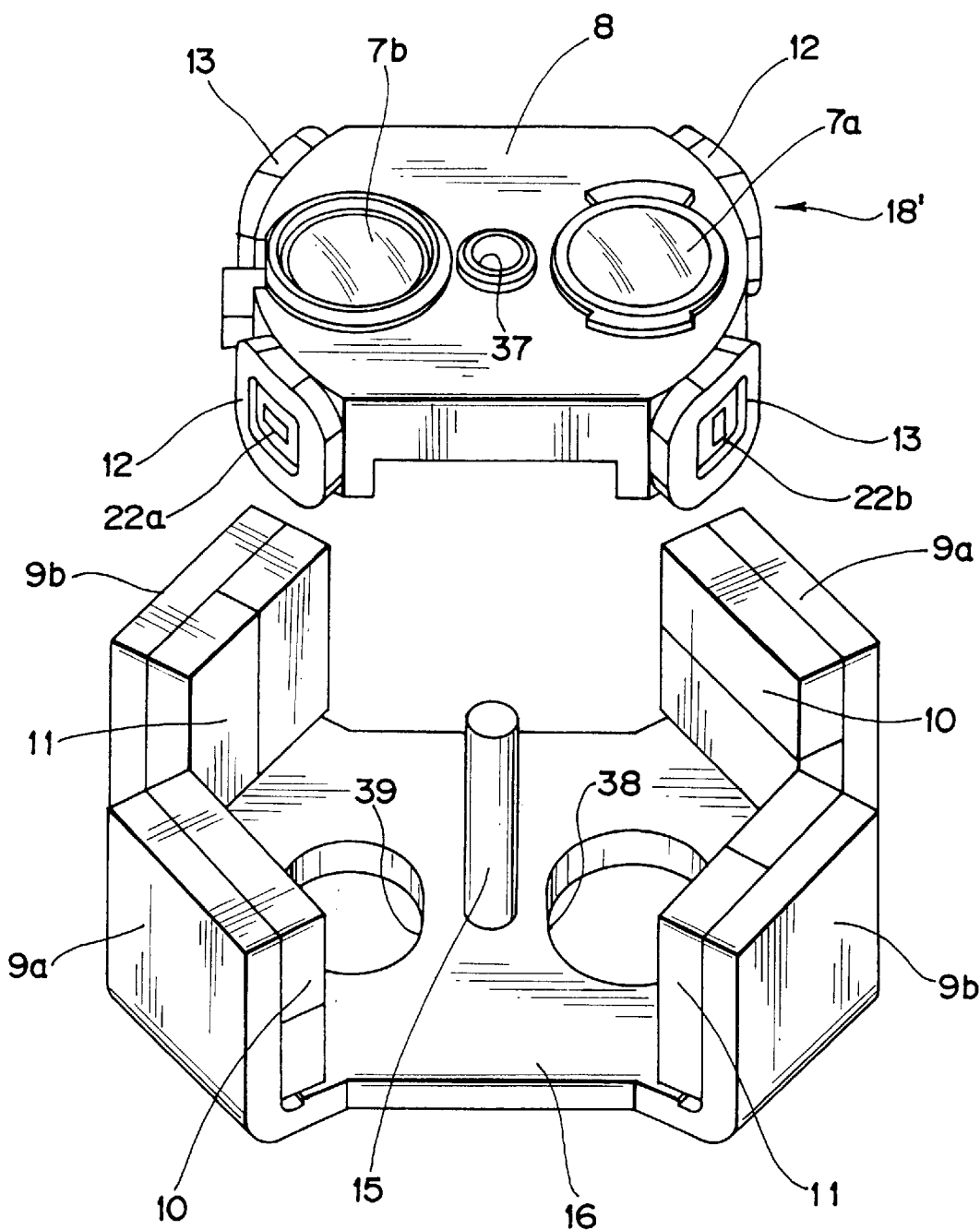
FIG. 7 is an exploded perspective view showing the configuration of the biaxial actuator serving as the essential part of the optical pick-up.

This biaxial actuator 19 includes, as shown in FIGS. 6 and 7, a columnar support shaft 15 substantially vertically provided on the base plate 16. Further, this biaxial actuator 19 includes a substantially disc-shaped lens bobbin 8 serving as a movable portion to which the respective object lenses 7a, 7b are attached. This lens bobbin 8 includes a bearing hole 37 at the central portion thereof to insert the support shaft 15 through the bearing hole 37, whereby it is supported by the support shaft 15 in the state where slide in the axial direction of the support shaft 15 and rotation around the axis of the support shaft 15 can be carried out. The respective object lenses 7a, 7b are adapted so that their optical axes are caused to be in parallel to the support shaft 15. Moreover, the respective object lenses 7a, 7b are disposed at positions substantially symmetrical with the bearing hole 37 being as center at the position spaced from the bearing hole 37. Accordingly, when the lens bobbin 8 is caused to undergo movement operation with respect to the support shaft 15, the respective object lenses 7a, 7b are caused to undergo movement operation in the optical axis direction of these object lenses 7a, 7b, i.e., in the focus direction indicated by arrow F in FIG. 2 and in the direction perpendicular to the optical axis of these object lenses 7a, 7b and the tangential line of the recording track, i.e., in the tracking direction indicated by arrow T in FIG. 3.

Moreover, at the lens bobbin 8, focus drive coils 12, 12 and tracking drive coils 13, 13 respectively serving as drive coils are attached. The focus drive coils 12, 12 are adapted so that a pair of drive coils are attached to the both side side surface portions of the lens bobbin 8 with the winding axial direction being as radial direction of the lens bobbin 8. These focus drive coils 12, 12 are disposed at positions symmetrical with each other with the support shaft 15 being as center. Further, the tracking drive coils 13, 13 are also adapted so that a pair of drive coils are attached to the both side side surface portions of the lens bobbin 8 with the winding axis direction being as the radial direction of the lens bobbin 8. These tracking drive coils 13, 13 are disposed at positions symmetrical with each other with the support shaft 15 being as center. One focus drive coil 12 and one tracking drive coil 13 are adjacent to each other at the side surface portion of the coil bobbin 8. Further, the other focus drive coil 12 and the other tracking drive coil 13 are adjacent to each other at the side surface portion of the coil bobbin 8.

At the side surface portion of the lens bobbin 8, central point maintaining contact pieces 22 for focus are attached in the state positioned substantially at the central portions of the focus drive coils 12, 12. This focus central point maintaining contact piece 22a is formed by magnetic material. Further, at the side surface portion of the lens bobbin 8, central point maintaining contact pieces 22b for tracking are attached in the state positioned substantially at the central portions of the tracking drive coils 13, 13. This tracking central point maintaining contact piece 22b is formed by magnetic material.

Further, this biaxial actuator 19 is constituted to form a magnetic circuit for allowing the respective drive coils 12, 12, 13, 13 to be positioned within magnetic field produced by magnets which will be referred to soon. This magnetic circuit consists of a pair of yokes 9a, 9a for focus drive and a pair of yokes 9b, 9b for tracking drive vertically provided on the base plate 16, and respective two pairs of magnets 10, 10, 11, 11 attached in correspondence with these yokes 9a, 9a, 9b, 9b. The respective yokes 9a, 9a, 9b, 9b are formed integrally with the base plate 16 by bending the peripheral edge side portions of the base plate 16 consisting of magnetic material toward the upper side. These yokes 9a, 9a, 9b, 9b are adapted so that respective principal surface portions facing to the central side of the base plate 16 are opposed to the outer circumferential side side surface portion of the lens bobbin 8.

The respective magnets 10, 10, 11, 11 are attached in correspondence with the principal surface portion facing to the central side of the base plate 16 of the respective yokes 9a, 9a, 9b, 9b. These respective magnets 10, 10, 11, 11 are adapted so that two (double) pole magnetization is implemented on one side surface. The respective magnetic poles are opposite to each other in correspondence with the focus drive coils 12, 12 and the tracking drive coils 13, 13 thus to place the focus drive coils 12, 12 and the tracking drive coils 13, 13 within magnetic field produced by the magnetic poles.

Magnetic field that the focus drive magnets 10, 10 attached to the respective focus drive yokes 9a, 9a form is magnetic field in a loop form ranging from the upper end side to the lower end side of these focus drive magnets 10, 10. Moreover, magnetic field that the tracking drive magnets 11, 11 attached to the respective tracking drive yokes 9b, 9b form is magnetic field in a loop form ranging from one end side to the other end side of these tracking drive magnets 11, 11.

In this biaxial actuator, when drive current is delivered to the focus drive coils 12, 12, the lens bobbin 8 undergoes action from magnetic field that the magnetic circuit forms and is thus caused to undergo movement operation in the axial direction of the support shaft 15, i.e., in the focus direction (in the optical axis direction of the object lens 7a, 7b). Moreover, in this biaxial actuator 19, when drive current is delivered to the tracking drive coils 13, 13, the lens bobbin 8 undergoes action from magnetic field that the magnetic circuit forms, and is thus rotated around the axis of the support shaft 15 as indicated by arrow T in FIG. 3 thus to allow the object lenses 7a, 7b to undergo movement operation in the tracking direction (in the direction perpendicular to the optical axis of the object lenses 7a, 7b).

Namely, in this biaxial actuator 19, focus drive current based on focus error signal which will be described later is delivered to the focus drive coils 12, 12 thus to allow the respective object lenses 7a, 7b to undergo movement operation following plane vibration of each of the optical discs 101, 102. Moreover, in this biaxial actuator 19, tracking drive current based on tracking error signal which will be described later is delivered to the tracking drive coils 13, 13 thus to allow the respective object lenses 7a, 7b to undergo movement operation following eccentricity of recording tracks of the optical discs 101, 102.

Further, in this biaxial actuator 19, the focus central point maintaining contact pieces 22a are attracted to the position where the magnetic flux density is maximum of magnetic field that the focus drive magnet 10 forms, whereby the coil bobbin 8 is held at the central point with respect to the focus direction. In addition, in this biaxial actuator 19, the tracking central point maintaining contact pieces 22b are attracted to the position where the magnetic flux density is maximum of magnetic field that the tracking drive magnet 11 forms, whereby the coil bobbin 8 is held at the central point with respect to the tracking direction.

[4] Configuration of the optical system block

Within the optical system block 17, as shown in FIG. 2, a laser coupler (light emitting/light receiving composite element) 6 including a semiconductor laser 1 serving as a first light source and a semiconductor laser chip 42 serving as a second light source is included. The semiconductor laser 1 and the semiconductor laser chip 42 respectively emit first and second laser beams which are rays of coherent light of linear polarized light. These laser beams are divergent light beams. The wavelength of the first laser beams that the semiconductor laser 1 emits is 635 nm or 650 nm which is the first wavelength. In addition, the wavelength of the second laser beams that the semiconductor laser chip 42 emits is 780 nm which is the second wavelength.

Figure 4:
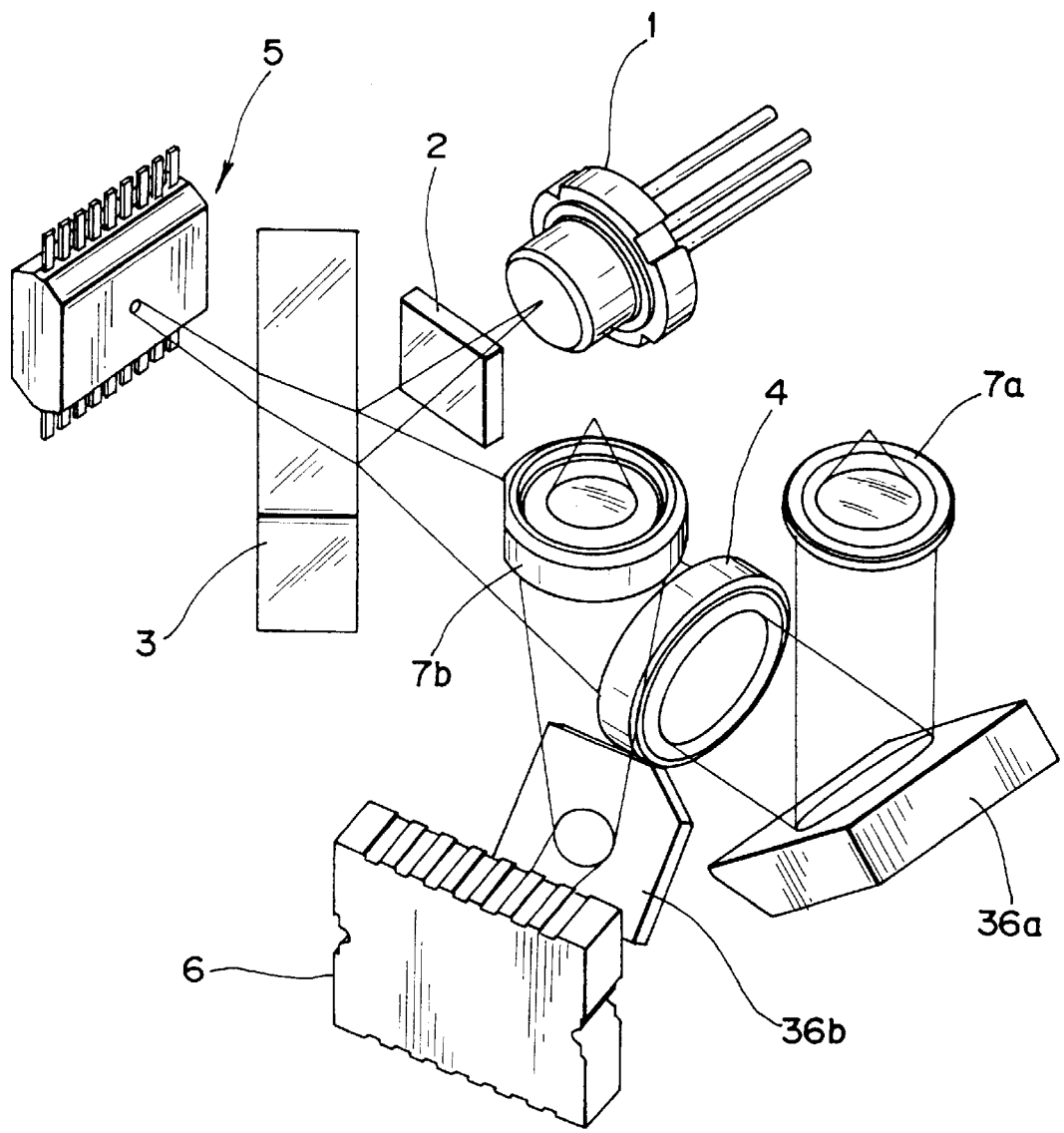
FIG. 4 is a perspective view showing the configuration of optical system in the optical pick-up.

As shown in FIG. 4, the first laser beams emitted from the semiconductor laser 1 are incident to a beam splitter 3 in a parallel plate form via a grating (diffraction grating) 2 serving as a light diffraction element. The grating 2 branches the first laser beam into three laser beams of the 0-th order light and the ±1-st order light. The beam splitter 3 is disposed in such a manner that the principal surface portion takes angle of 45° relative to the optical axis of the first laser beams. This beam splitter 3 allows a portion of the first laser beams to be transmitted therethrough, but allows the remaining portion to be reflected. The first laser beams reflected by the beam splitter 3 are incident to the collimator lens 4, and are caused to be the first parallel laser beams by the collimator lens 4.

The first parallel laser beams which have been passed through the collimator lens 4 are emitted toward the external side of the optical system block 17 through first through-hole provided at the outer casing portion of the optical system block 17. Further, the first parallel laser beams are incident to the first object lens 7a. This first object lens 7a converges the first parallel laser light beams onto the signal recording layer of the optical disc 101 of the first kind.

Figure 5:
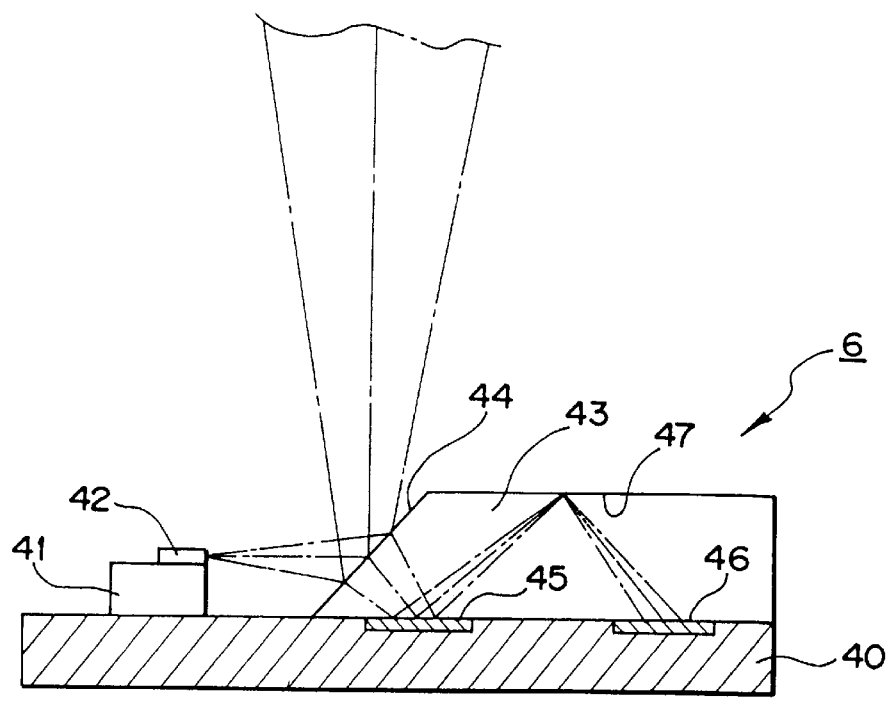
FIG. 5 is a longitudinal cross sectional view showing the configuration of laser coupler (light emitting/light receiving composite element) used in the optical pick-up.

As shown in FIG. 5, the laser coupler 6 is caused to be of a structure in which the semiconductor laser chip 42 and first and second photo-detectors 45, 46 are disposed on the same semiconductor base (substrate) portion 40. The semiconductor laser chip 42 is disposed through a heat sink 41 on the semiconductor base portion 40. The respective photo-detectors 45, 46 are formed on the semiconductor base portion 40 in the state where they are respectively divided into plural light receiving surfaces.

Further, in the laser coupler 6, a beam splitter prism 43 is disposed in the state positioned on the respective photo-detectors 45, 46. This beam splitter prism 43 is adapted so that a beam splitter surface 44 which is the slanting surface portion having a predetermined inclination angle with respect to the upper surface portion of the semiconductor base portion 40 is directed to the semiconductor laser chip 42 side.

In this laser coupler 6, the semiconductor laser chip 42 emits the second laser beams toward the beam splitter surface 44. The second laser beams emitted from the semiconductor laser chip 42 are reflected by the beam splitter surface 44, and are emitted upwardly in a direction perpendicular to the semiconductor base portion 40.

The second laser beams emitted from the laser coupler 6 are emitted toward the external side of the optical system block 17 through second through-hole provided at the outer casing portion of the optical system block 17. Further, the second parallel laser beams are incident to the second object lens 7b. The second laser light beams incident to the second object lens 7b are converged onto the surface portion of signal recording layer 102b of the optical disc 102 of the second kind after transmitted through the transparent base 102a of the optical disc 102 of the second kind by the second object lens 7b. In this example, the first through-hole and the second through-hole are formed at positions substantially symmetrical with each other with the support shaft 15 being as center.

Further, at the upper surface portion of the optical system block 17, a skew sensor 18 which also serves as base thickness detecting means is attached. This skew sensor 18 is caused to be of the structure including light emitting element like LED and plural light receiving elements like photo-diode. This skew sensor 18 is caused to be of structure adapted to irradiate light that the light emitting element emits onto the optical disc loaded on the disc table 25 to detect position (intensity distribution) of reflected light by the optical disc of the light by the light receiving element to thereby permit detection of the inclination (skew) of the optical disc and the thickness of the transparent base of the optical disc.

Figure 20:
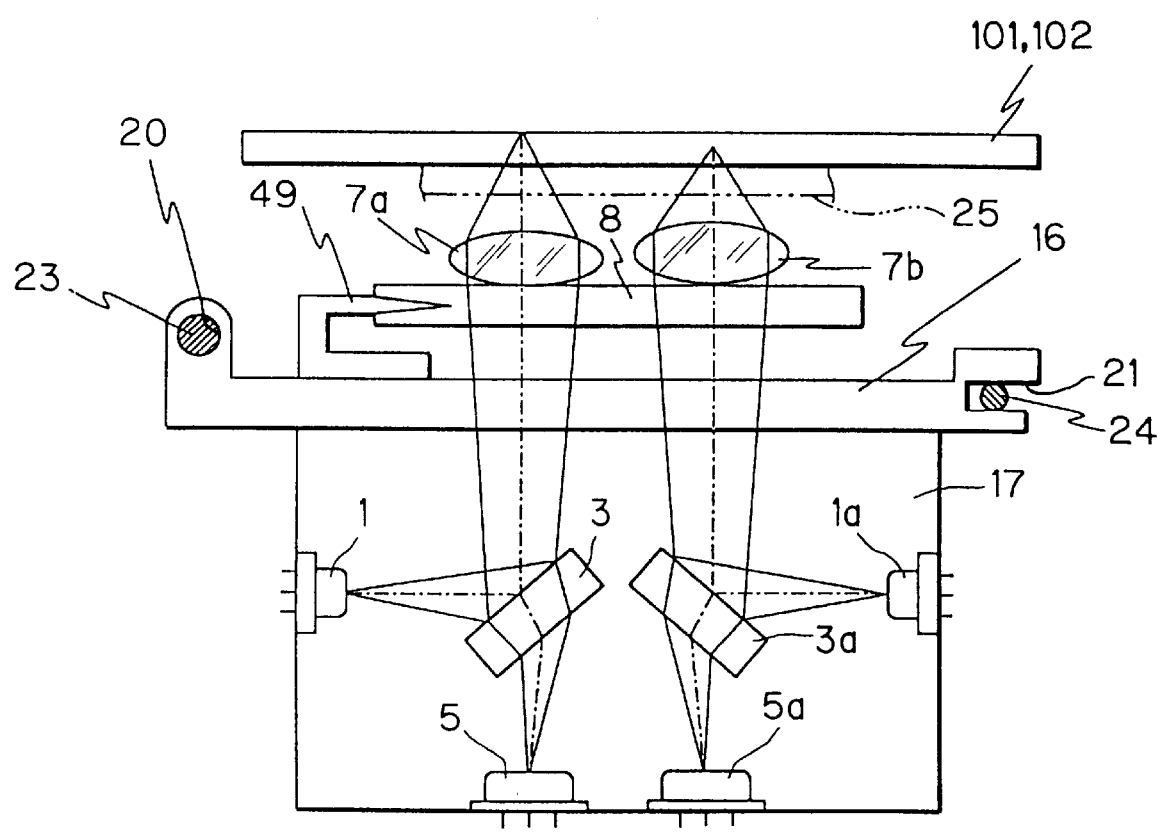
FIG. 20 is a side view showing outline of the configuration of the inside of the optical pick-up with a portion thereof being broken.

Further, within the optical system block 17, as shown in FIG. 20, first semiconductor laser 1 serving as the first light source and second semiconductor laser 1 a serving as the second light source may be included. The respective semiconductor laser devices 1, 1a respectively emit first and second laser beams which are rays of coherent light of linearly polarized light. These laser beams are divergent light beams. The wavelength of the first laser beams that the first semiconductor laser 1 emits is 635 nm or 650 nm which is the first wavelength. In addition, the wavelength of the second laser beams that the second semiconductor laser 1a emits is 780 nm which is the second wavelength.

The first laser beams emitted from the first semiconductor laser 1 are incident to the beam splitter 3 in parallel plate form via grating (not shown). The grating branches each first laser beam into three laser beams of 0-th order light and ±1-st order light. The beam splitter 3 is disposed in such a manner that the principal surface takes angle of 45° with respect to the optical axis of the first laser beams. This beam splitter 3 allows a portion of the first laser beams to be transmitted therethrough, but allows the remaining portion to be reflected. The first laser light beams reflected by the beam splitter 3 are emitted toward the external side of the optical system block 17 through through-hole provided at the upper surface portion of the optical system block 17. Further, the first laser light beams are incident to the first object lens 7a supported by the biaxial actuator 19. This object lens 7a converges the first laser beams onto the signal recording layer of the optical disc 101 of the first kind.

Further, the first laser beams reflected on the surface of the signal recording layer of the optical disc 101 of the first kind are received by the first photo-detector 5 after transmitted through the first object lens 7a and the beam splitter 3.

Further, the second laser light beams emitted from the second semiconductor laser 1a are incident to the beam splitter 3a in a flat plate form. This beam splitter 3a is disposed in such a manner that the principal surface takes angle of 45° with respect to the optical axis of the second laser beam. This beam splitter 3a allows a portion of the second laser beams to be transmitted therethrough, but allows the remaining portion to be reflected. The second laser beams reflected by the beam splitter 3a are emitted toward the external side of the optical system block 17 through through-hole provided at the upper surface portion of the optical system block 17. Further, the second laser light beams are incident to the second object lens 7b supported by the biaxial actuator 19. This second object lens 7b converges the second laser light beams onto the signal recording layer of the optical disc 102 of the second kind.

Further, the second laser light beams reflected on the surface of the signal recording layer of the optical disc 102 of the second kind are received by the second photo-detector 5a after transmitted through the second object lens 7b and the beam splitter 3a.

Figure 26:
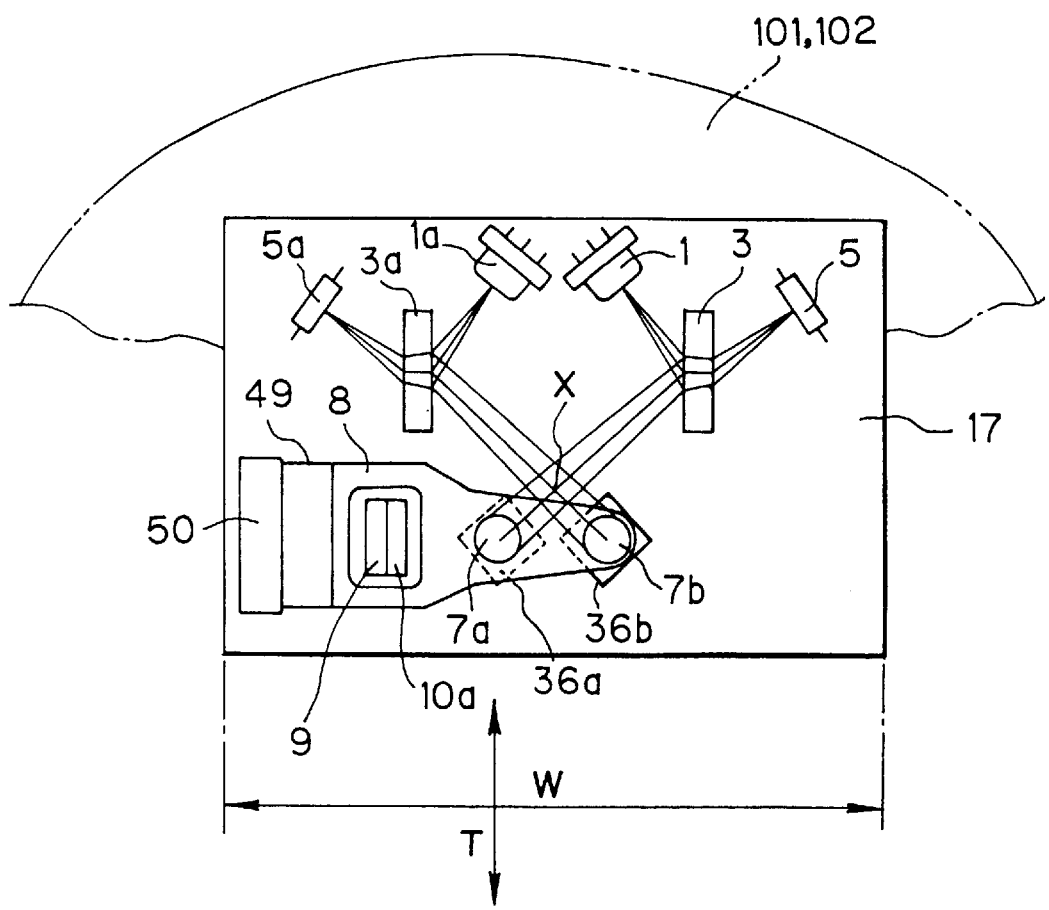
FIG. 26 is a plan view showing outline of another example of the configuration of the optical pick-up.
Figure 27:
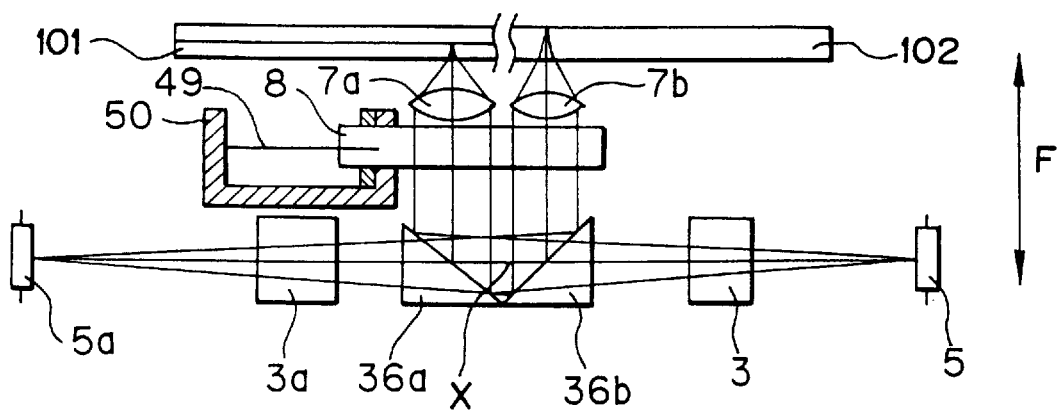
FIG. 27 is a longitudinal cross sectional view showing the configuration of the optical pick-up shown in FIG. 26.

Further, in this optical pick-up, as shown in FIG. 26, there may be employed a configuration in which a first optical path ranging from the first semiconductor laser 1 to the first object lens 7a and a second optical path ranging from the second semiconductor laser 1a to the second object lens 7b cross with each other at the crossing point X. This crossing point X is positioned between the beam splitter 3 and a first reflection mirror 36a on the first optical path. As shown in FIG. 27, the first reflection mirror 36a serves to deflect the first laser beams to allow them to be incident to the first object lens 7a. In addition, this crossing point X is positioned between the beam splitter 3a and a second reflection mirror 36b on the second optical path. As shown in FIG. 27, the second reflection mirror 36b serves to deflect the second laser beams to allow them to be incident to the second object lens 7b.

In this optical pick-up, the respective optical paths are crossed with each other, whereby the sum total of volume that these optical paths occupy is decreased to a degree that the respective optical paths overlap with each other. For this reason, in this optical pick-up, sizes (dimensions) in the arrangement direction of the respective object lenses 7a, 7b of the optical system block 17 indicated by arrow W in FIG. 26 can be reduced.

Figure 28:
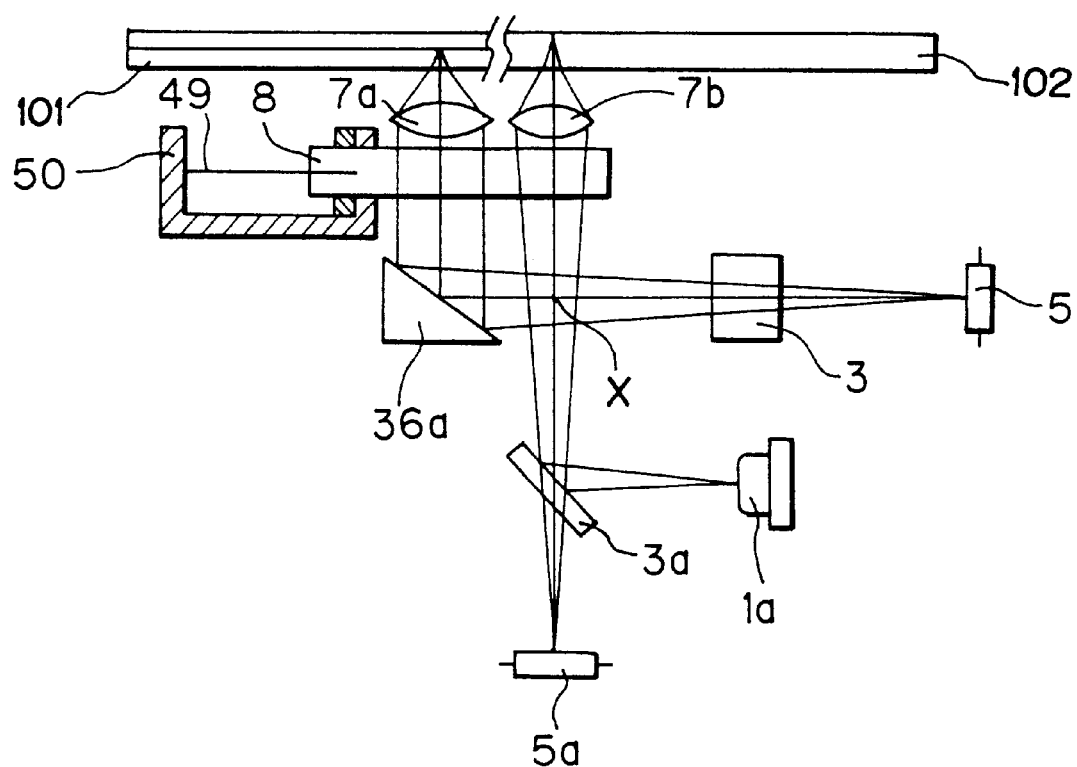
FIG. 28 is a plan view showing outline of a further example of the configuration of the optical pick-up.
Figure 29:
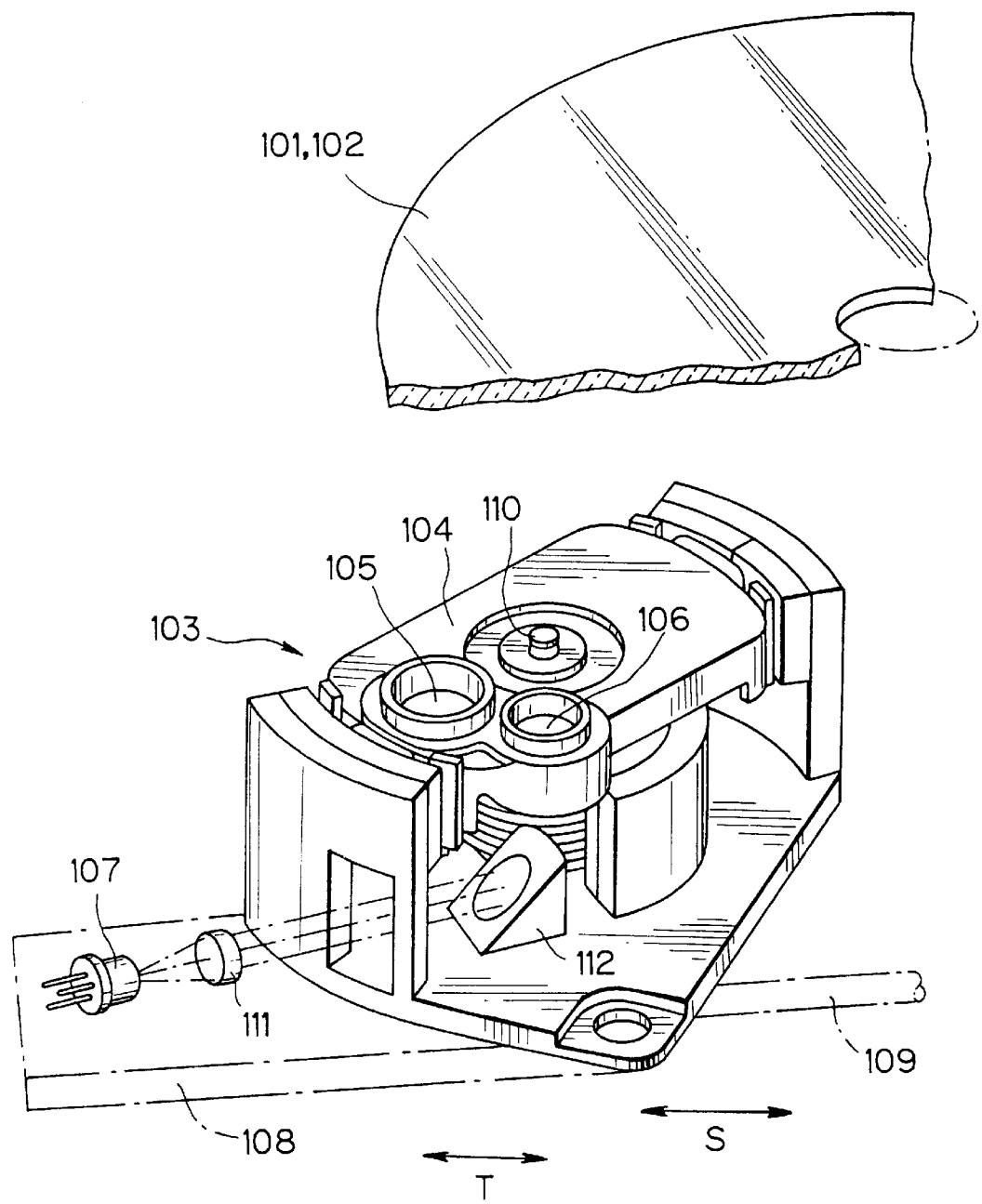
FIG. 29 is a perspective view showing the configuration of a conventional optical pick-up.

Moreover, with respect to the optical path configuration for the first and second light beams within the optical system block 17, as shown in FIG. 28, the optical path configuration may be such that the reflection mirror is not provided in one optical path of these optical paths. Namely, the first laser beams emitted from the first semiconductor laser are incident to the beam splitter 3 in flat plate form. This beam splitter 3 is disposed in the state where the principal surface portion takes angle of 45° with respect to the optical axis of the first laser beams. This beam splitter 3 allows a semiconductor laser 1 to the first object lens 7a and the second optical path ranging from the second semiconductor laser 1a to the second object lens 7b cross their optical axes with each other at the crossing point X. This crossing point X is positioned between the beam splitter 3 and the reflection mirror 36a on the first optical path. In addition, this crossing point X is positioned between the beam splitter 3a and the second object lens 7b on the second optical path.

Also in this optical pick-up, the respective optical paths are crossed with each other, whereby the sum total of volume that these optical paths occupy is decreased to such a degree that the respective optical paths overlap with each other. For this reason, also in this optical pick-up, the size (dimensions) of the optical system block 17 can be reduced.

[5] Configuration of the disc player

Figure 22:
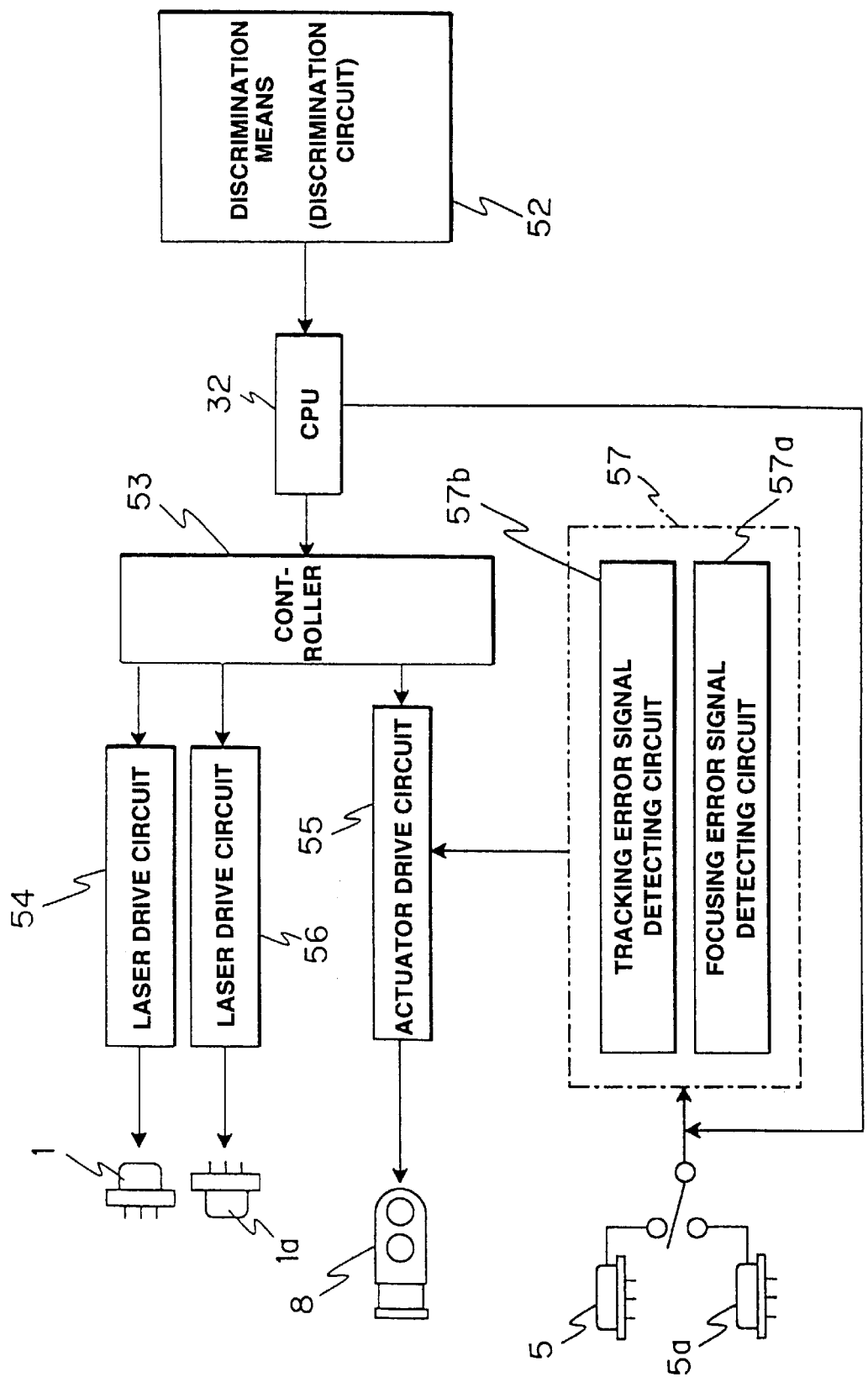
FIG. 22 is a block diagram showing the configuration of a disc player according to this invention.

The disc player according to this invention includes, as shown in FIG. 22, discrimination means (discrimination circuit) 52 for discriminating kind of the disc-shaped optical recording medium loaded on the disc table 25, a CPU (Central Processing Unit) 32 which is a control circuit, and a controller 53 for carrying out various controls in dependency upon signals sent out from the CPU 32.

In the case where the optical disc 101 of the first kind is loaded on the disc table 25, it is discriminated by the discrimination means 52 in accordance with read result of the discrimination label, portion of the first laser beams to be transmitted there through, and allows the remaining portion to be reflected. The first laser beams reflected by the beam splitter 3 are reflected by the reflection mirror 36a, and are emitted toward the external side of the optical system block 17 through through-hole provided at the upper surface portion of the optical system block 17. Further, the first laser beams are incident to the first object lens 7a. This object lens 7a converges the first laser beams onto the signal recording layer of the optical disc 101 of the first kind.

Further, within the optical system block 17, the second laser beams emitted from the second semiconductor laser 1a are incident to the beam splitter 3a in a flat plate form. This beam splitter 3a is disposed in the state where the principal surface portion is inclined so as to take angle of 45° with respect to the optical axis of the second laser beams. This beam splitter 3a allows a portion of the second laser beams to be transmitted there through and allows the remaining portion to be reflected. The second laser beams reflected by the beam splitter 3a are emitted toward the external side of the optical system block 17 through through-hole provided at the upper surface portion of the optical system block 17. In addition, the second laser beams are incident to the second object lens 7b. This second object lens 7b converges the second laser beams onto the signal recording layer of the optical disc 102 of the second kind.

In this case, the first optical path ranging from the first which is so called ID, of the optical disc 101 of the first kind that the loaded disc-shaped optical recording medium is the optical disc 101 of the first kind. As a result, a discrimination signal thus obtained is sent to the controller 53 via the CPU 32.

The controller 53 respectively send drive signals to a laser drive circuit 54 and a biaxial actuator drive circuit 55 on the basis of the discrimination signal sent thereto to drive the first semiconductor laser I and the biaxial actuator 19. Further, the first laser beams are emitted from the first semiconductor laser 1. Thus, read operation of information signal from the optical disc 101 of the first kind is carried out through the first photo-detector 5.

On the other hand, in the case where the optical disc 102 of the second kind is loaded on the disc table 25, it is discriminated by the discrimination means 52 in accordance with read result of the discrimination label, which is so called ID, of the optical disc 102 of the second kind that the loaded disc-shaped optical recording medium is the optical disc 102 of the second kind. As a result, a discrimination signal thus obtained is sent to the controller 53.

The controller 53 respectively send drive signals to a laser drive circuit 56 and the biaxial actuator drive circuit 55 on the basis of the discrimination signal sent thereto to drive a second semiconductor laser 1a and the biaxial actuator 19. Then, second laser beams are emitted from the second semiconductor laser 1a. Thus, read operation of information signal from the optical disc 102 of the second kind is carried out through the second photo-detector 5a.

Moreover, also in the case where any one of the optical discs 101, 102 is loaded on the disc table 25, output signals from the photo-detectors 5, 5a are sent to a focusing error signal detecting circuit 57a and a tracking error signal detecting circuit 57b.

Output signals from these photo-detectors 5, 5a include focus error signal and tracking error signal in addition to read signal. The respective error signal detecting circuits 57a, 57b detect the focus error signal and the tracking error signal by the signals sent thereto. The focus error signal and the tracking error signal are sent from the error signal detecting circuit 57 to the biaxial actuator drive circuit 55. The biaxial actuator 19 is driven on the basis of the focus error signal and the tracking error signal.

Further, in the disc player, as shown in FIG. 8, a detection output obtained by the skew sensor 18 is sent to the control circuit (CPU) 32 serving as control means. Furthermore, a signal outputted from the optical pick-up and a detection signal from an inner circumference sensor switch 31 which detects that the optical pick-up is located at the position nearest to the spindle motor 27 are sent to the control circuit 32. This control circuit 32 controls, in accordance with various signals sent thereto, a pick-up driver 34 including the actuator drive circuit 55, a spindle motor driver 35 and a sled motor driver 33. The pick-up driver 34 controls drive of the biaxial actuator 19 in the optical pick-up, and light emitting/light quenching of the semiconductor laser 1 and the semiconductor laser chip 42. The spindle motor driver 35 controls rotational drive of the spindle motor 27. In addition, the sled motor drive 33 controls rotational drive of the sled motor 30.

Further, the control circuit 32 is operative so that in the case where it is judged by detection output sent from the skew sensor 18 that the optical disc loaded on the disc table 25 is the optical disc 101 of the first kind, it allows the semiconductor laser 1 to emit light, and allows the semiconductor laser chip 42 or the second semiconductor laser 1a to be quenched. At this time, the first laser beams which have been passed through the first object lens 7a are irradiated onto the optical disc 101 of the first kind from the transparent base side of the optical disc 101 of the first kind, and are converged onto the signal recording layer after transmitted through the transparent base. The first object lens 7a is caused to undergo movement operation in the optical axis direction of the first object lens 7a and in the direction perpendicular to the optical axis by the biaxial actuator 19. This object lens 7a is caused to undergo movement operation in a manner to follow displacement in the optical axis direction (so called plane vibration) of the first object lens 7a of the optical disc 101 of the first kind by the biaxial actuator 19 to thereby allow the focal point of the laser beams to be positioned on the signal recording layer at all times. Further, this object lens 7a is caused to undergo movement operation in a manner to follow displacement in the direction perpendicular to the optical axis of the first object lens 7a of recording track of the optical disc 101 of the first kind by the biaxial actuator 19 to thereby allow the focal point of the first laser beams to be positioned on the recording track at all times.

This optical pick-up irradiates, in the converged state, the first laser beams onto the signal recording layer of the optical disc 101 of the first kind to thereby carry out write and read operations of information signals with respect to this signal recording layer. In the write operation of information signals, in the case where the optical disc 101 of the first kind is a magneto-optical disc, the first laser beams are irradiated onto the magneto-optical disc, and external magnetic field is applied to irradiation position of the first laser beams. By modulating either light output of the first laser beams or strength of the external magnetic field in dependency upon an information signal to be recorded, write operation of information signal with respect to the magneto-optical disc is carried out. In addition, in the case where the optical disc 101 of the first kind is phase change type disc, light output of the first laser beams is modulated in dependency upon an information signal to be recorded, whereby write operation of the information signal with respect to the phase change type disc is carried out.

Further, in this optical pick-up, the first laser beams are irradiated in the converged state onto the signal recording layer of the optical disc 101 of the first kind to detect reflected light beams by the signal recording layer of the laser beams, whereby read (read-out) operation of information signal from the signal recording layer is carried out.

In the read operation of information signals, in the case where the optical disc 101 of the first kind is the magneto-optical disc, change in the polarization direction of the reflected light beams is detected, whereby read operation of information signals from the magneto-optical disc is carried out. Further, in the case where the optical disc 101 of the first kind is the phase change type disc, or the so-called pit disc, change of quantity of reflected light of the reflected light beams is detected, whereby read operation of information signals is carried out.

Namely, the first laser beams converged on the signal recording layer are reflected by the signal recording layer, and return to the first object lens 7a as reflected light beams. The reflected light beams which have returned to the first object lens 7a are caused to be parallel light beams by the first object lens 7a, and return to the beam splitter 3 via the collimator lens 4. The reflected light beams which have returned to the beam splitter 3 are transmitted through the beam splitter 3, and are branched with respect to the optical path returning to the semiconductor laser 1. The light beams thus branched are traveled toward the photo-detector 5.

Since the beam splitter 3 is a parallel plane plate inclined with an angle of 45° with respect to the optical axis of the reflected light beams, astigmatism is caused to take place in the reflected light beams. Moreover, in the case where the optical disc 101 of the first kind is a magneto-optical disc, the reflected light beams which have been passed through the beam splitter 3 are incident to the photo-detector 5 via Wollaston prism. The Wollaston prism branches each reflected light beam into three light beams of first polarization component which is polarized light in a polarization direction of the reflected light beam, a second polarization component which is polarized light in a direction of +45° with respect to polarization direction of the reflected light beam, and a third polarization component which is polarized light in a direction of −45° with respect to the polarization direction of the reflected light beam.

The photo-detector 5 is caused to be of the structure including plural photo-diodes corresponding to plural light beams branched by the grating 2 and the Wollaston prism and adapted to receive the respective light beams by photo-diodes respectively corresponding thereto. Light detection outputs from the respective photo-diodes of the photo-detector 5 are caused to undergo arithmetic processing, whereby a read signal of information signal recorded on the magneto-optical disc, a focus error signal and a tracking error signal are generated. The focus error signal is a signal indicating quantity and direction of positional deviation in the optical axis direction of the first object lens 7a between focal point of the first laser beam by the first object lens 7a and the surface portion of the signal recording layer of the optical disc 101 of the first kind. The tracking error signal is a signal indicating quantity and direction of positional deviation in a direction perpendicular to the optical axis of the first object lens 7a between the focal point of the first laser beam by the first object lens 7a and the recording track of the optical disc 101 of the first kind. The biaxial actuator 19 is driven on the basis of the focus error signal and the tracking error signal.

In the photo-detector 5, the photo-diode which receives reflected light beam from the signal recording layer of the 0-th order light of the first laser beam is caused to be of the structure including four light receiving surface portions radially arranged with the optical axis of the reflected light beam being as center. Further, beam spot that the reflected light beam forms on the light receiving surfaces of the four photo-diodes is caused to be elliptical beam spot in which the long diameter direction is caused to be direction corresponding to the direction of astigmatism produced by the beam splitter 3. Assuming now that light detection outputs from the four light receiving portions are respectively designated at a, b, c, d, $$Fe=(a+c)-(b+d)$$

is a signal indicating direction and quantity of astigmatism of the reflected light beam. This Fe is a focus error signal, and is a signal indicating distance between the focal point of the first laser beam by the first object lens 7a and the signal recording surface of the optical disc 101 of the first kind and direction thereof.

The biaxial actuator 19 is driven on the basis of the focus error signal Fe to allow the first object lens 7a to undergo movement operation to thereby execute focus servo operation for allowing the focal point of the first laser beam by the first object lens 7a to be positioned on the signal recording surface at all times.

Further, in the photo-detector 5, the photo-diode which receives reflected light beams from the signal recording layer of ±1-st order light of the first laser beam is caused to be of the structure including two light receiving portions independent each other. In addition, when the focal point by the first object lens 7a of the 0-th order light of the first laser beam is positioned on the recording track, light quantities of reflected light beams of the ±1-st order light are equal to each other. Assuming now that light detection outputs from the two light receiving surface portions are respectively designated at e and f, $$Te = e - f$$

is a signal indicating difference between light quantities of reflected light beams of the ±1-st order light. This Te is a tracking error signal, and is a signal indicating distance between the focal point of the 0-th order light of the first laser beam by the first object lens 7a and the recording track of the optical disc 101 of the first kind and direction thereof.

The biaxial actuator 19 is driven on the basis of the tracking error signal Te to allow the first object lens 7a to undergo movement operation to thereby execute the tracking servo operation for allowing the focal point of the 0-th order light of the first laser beam by the first object lens 7a to be positioned on the recording track at all times.

Further, this optical pick-up is caused to undergo movement operation along the guide shaft 23 and the support shaft 24, whereby the first object lens 7a is caused to undergo movement operation so that the first object lens 7a is opposed with respect to the entire range of the signal recording area of the optical disc 101 of the first kind. Thus, write and read operations of information signals can be carried out with respect to the entire range of the signal recording area. Namely, this optical pick-up is caused to undergo movement operation along inner and outer circumferential direction of the optical disc 101 of the first kind, and the optical disc 101 of the first kind is caused to undergo movement operation, whereby the optical pick-up can carry out write and read operations of information signals with respect to the entire range of the signal recording area of the optical disc 101 of the first kind.

Meanwhile, in this optical pick-up, detection of the tracking error signal with respect to the optical disc 101 of the first kind is carried by the so-called three beam method as described above. Accordingly, in this optical pick-up, as shown in FIG. 3, the first object lens 7a is caused to undergo movement operation along the inner and outer circumferential directions of the optical disc 101 of the first kind in the state opposite to line passing through the center of the disc table 25, i.e., the center of the disc table 25, viz., in the state where its optical axis is crossed with line passing through the center of the optical disc 101 of the first kind.

Further, the control circuit 32 is operative so that in the case where it is judged by detection output sent from the skew sensor 18 that the optical disc loaded on the disc table 25 is the optical disc 102 of the second kind, it allows the semiconductor laser chip 42 or the second semiconductor laser 1a to emit light and allows the semiconductor laser 1 to be quenched. At this time, the second laser beams which have been passed through the second object lens 7b are irradiated onto the optical disc 102 of the second kind from the transparent base side of the optical disc 102 of the second kind, and are converged onto the signal recording layer 102b after transmitted through the transparent base 102a. The second object lens 7b is caused to undergo movement operation in the optical axis direction of the second object lens 7b and in the direction perpendicular to the optical axis by the biaxial actuator 19. This second object lens 7b is caused to undergo movement operation by the biaxial actuator 19 in a manner to follow displacement in the optical axis direction (so called plane vibration) of the second object lens 7b of the optical disc 101 of the second kind to thereby allow the focal point of the second laser beams to be positioned on the signal recording layer 102b at all times. In addition, this second object lens 7b is caused to undergo movement operation by the biaxial actuator 19 in a manner to follow displacement in the direction perpendicular to the optical axis of the second object lens 7b of recording track of the optical disc 102 of the second kind to thereby allow the focal point of the second laser beams to be positioned on the recording track at all times.

This optical pick-up irradiates, in the converged state, the second laser beams onto the signal recording layer 102b of the optical disc 102 of the second kind to thereby carry out read operation of information signals from the signal recording layer 102b. Namely, in this optical pick-up, the second laser light beams are irradiated, in the converged state, onto the signal recording layer 102b of the optical disc 102 of the second kind to detect reflected light beams by the signal recording layer 102b of the second laser beams, whereby read operation of information signals from the signal recording layer 102b is carried out. Such read operation of information signals is carried out by detecting changes of quantity of reflected light of the reflected light beams.

Namely, the second laser light beam converged on the surface portion of the signal recording layer 102b is reflected by the signal recording layer 102b and returns to the second object lens 7b. The reflected light beam which has returned to the second object lens 7b return to the beam splitter surface 44.

The reflected light beam which has returned to the beam splitter surface 44 is transmitted through the beam splitter surface 44 and is then incident into the beam splitter prism 43, whereby this reflected light beam is branched from the optical path returning to the semiconductor laser chip 42. The branched light beams are received by the first photo-detector 45. In addition, this reflected light beam is reflected by the surface portion of the first photo-detector 45 and the internal surface portion 47 of the beam splitter prism 43, and is received also by the second photo-detector 46.

On the basis of light detection outputs outputted from the respective photo-detectors 45, 46, a read signal (RF signal) of information signal recorded on the optical disc 102 of the second kind, a focus error signal Fe indicating deviation in the optical axis direction (focus error) between the focal point of the second laser beams by the second object lens 7b and the surface portion of the signal recording layer 102b, and a tracking error signal Te indicating deviation in a direction perpendicular to the optical axis and the recording track (tracking error) between the focal point and the recording track formed at the surface portion of the signal recording layer 102b are calculated.

Namely, the read-out signal (RF signal) is obtained as sum of respective light detection outputs of the photo-detectors 45, 46. Moreover, the focus error signal Fe is obtained as difference between respective light detection outputs of the photo-detectors 45, 46.

Further, the tracking error signal Te is obtained as difference ((A+D)−(B+C)) between sum of light detection output (A) from the light receiving surface of the side of one side of the first photo-detector 45 and light detection output (D) from the light receiving surface of the side of the other side of the second photo-detector 45 and sum of light detection output (B) from the light receiving surface of the side of the other side of the first photo-detector 45 and light detection output (C) from the light receiving surface of the side of one side of the second photo-detector 45.

Namely, in this optical pick-up, with respect to the optical disc 102 of the second kind, detection of the tracking error signal is carried out by the so-called push-pull method of the so-called 1 beam system.

In this example, in the above-mentioned respective photo-detectors 45, 46, the divisional line between the light receiving surface of the side of one side and the light receiving surface of the side of the other side is adapted so as to take angle of 45° with respect to the tangential (line) direction of recording tracks in the optical disc 102 of the second kind.

Moreover, the first photo-detector 45 is of a structure in which the light receiving surface of the side of one side is divided into first and third light receiving portions $A_1$, $A_3$ (light detection outputs $A_1$, $A_3$) and the light receiving surface of the side of the other side is divided into the second and fourth light receiving portions $A_2$, $A_4$ (light detection outputs $A_2$, $A_4$) so that it is quadrisected in total. Further, the second photo-detector 46 is of a structure in which the light receiving surface of the side of one side is divided into first and third light receiving portions $B_1$, $B_3$ (light detection outputs $B_1$, $B_3$), and the light receiving surface of the side of the other side is divided into second and fourth light receiving portions $B_2$, $B_4$ (light detection outputs $B_2$, $B_4$) so that it is quadrisected in total. Accordingly, the tracking error signal Te is obtained from light detection outputs of the respective light receiving portions by the following formula:

$$(A_2+A_4+B_1+B_3)-(A_1+A_3+B_2+B_4)$$

Further, this optical pick-up is caused to undergo movement operation along the guide shaft 23 and the support shaft 24, whereby the second object lens 7b is caused to undergo movement operation in such a manner that it is opposite with respect to the entire range of the signal recording area of the optical disc 102 of the second kind. Thus, read operation of information signals can be carried out with respect to the entire range of the signal recording area. Namely, this optical pick-up is caused to undergo movement operation along the inner and outer circumferential directions of the optical disc 102 of the second kind, and the optical disc 102 of the second kind is caused to undergo rotational operation, thereby making it possible to carry out read (read-out) operation of information signals with respect to the entire range of the signal recording area of the optical disc 102 of the second kind.

Further, in the disc player according to this invention, the above-mentioned base thickness detecting means is not limited to sensor used in a manner doubling as skew sensor 18 as described above, but may be adapted to judge base thickness by the control circuit 32 on the basis of amplitude of RF signal which is read either one of the optical discs 101, 102 of the first kind and the second kind is loaded on the disc table 25, either one of the first and second light sources, which has been determined in advance, is caused to emit light. At this time, if only the focus servo is caused to be operative, detection of the amplitude of the RF signal can be detected. In addition, it is possible to judge, on the basis of whether either the first or second light source is caused to emit light, and amplitude of the detected RF signal, whether either the optical disc of the first kind or the optical disc of the second kind is loaded on the disc table 25.

[6] Another form (1) of the configuration of the biaxial actuator

In the optical pick-up according to this invention, as shown in FIGS. 9 to 12, the biaxial actuator 19 may be caused to be of the structure comprising focus coil 12 wound on the outer circumferential surface of the coil bobbin 8.

Figure 9:
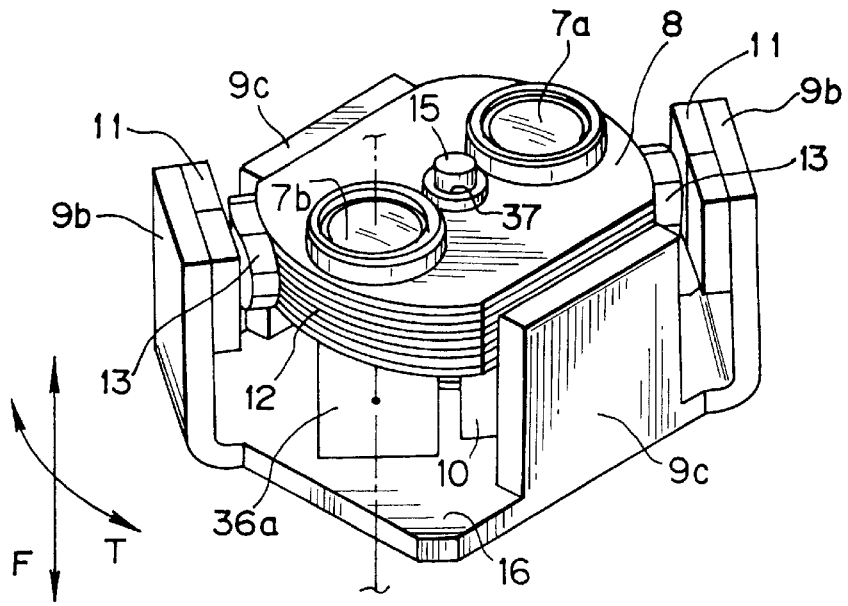
FIG. 9 is a perspective view showing another example of the configuration of the biaxial actuator.

Similarly to the above-described biaxial actuator, this biaxial actuator 19 also supports the first and second object lenses 7a, 7b so that they are permitted to undergo movement operation in the optical axis direction of these respective object lenses 7a, 7b, i.e., in the focus direction indicated by arrow F in FIG. 9 and in a direction perpendicular to the optical axis, i.e., in the tracking direction indicated by arrow T in FIG. 9. These object lenses 7a, 7b are opposed to the signal recording layer of either one of the optical discs 101, 102 loaded on the disc table 25 by allowing the optical pick-up 19 to be attached onto the optical system block 17, and are caused to undergo movement operation along the inner and outer circumferential directions of the optical discs 101 or 102 by allowing the optical system block 17 to undergo movement operation along the guide shaft 23 and the support shaft 24. The first and second object lenses 7a, 7b are arranged in a direction substantially perpendicular to the length direction of the guide shaft 23, i.e., in the circumferential direction of the optical discs 101 or 102 loaded on the disc table 25.

Figure 10:
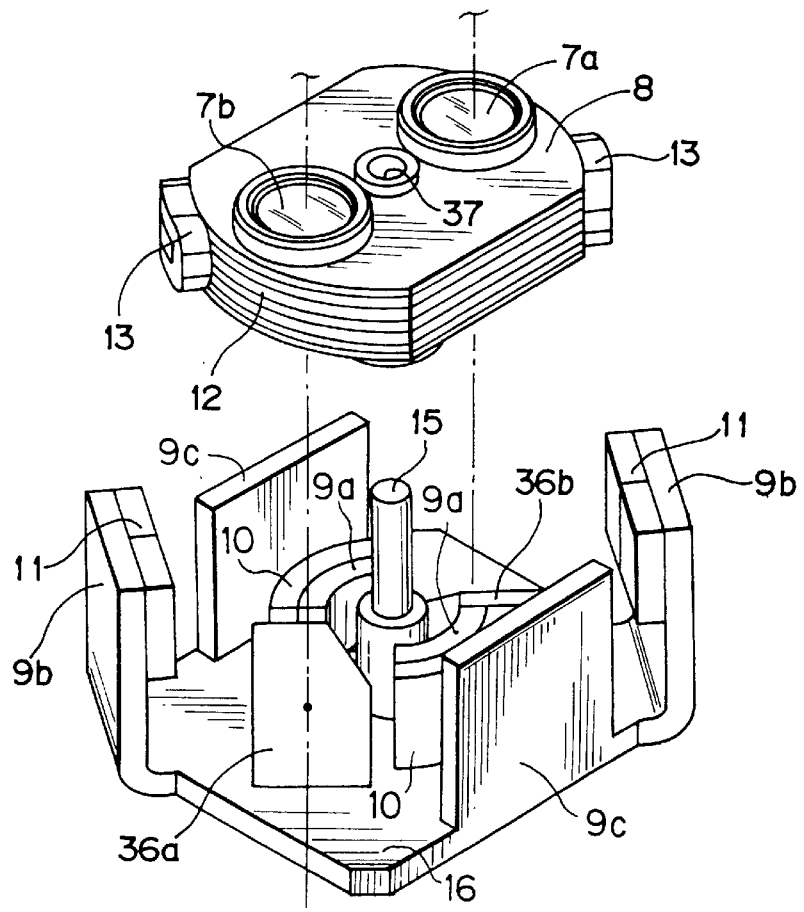
FIG. 10 is an exploded perspective view showing the configuration of the biaxial actuator shown in FIG. 9.

This biaxial actuator 19 includes, as shown in FIGS. 9 and 10, a columnar support shaft 15 substantially vertically provided on the base plate 16. Further, this biaxial actuator 19 includes a substantially disc-shaped lens bobbin 8 serving as a movable portion to which the respective object lenses 7a, 7b are attached. This lens bobbin 8 includes a bearing hole 37 at the central portion thereof. By inserting the support shaft 15 through the bearing hole 37, the lens bobbin 8 is supported in the state where slide in the axial direction of the support shaft 15 and rotation around the axis of the support shaft 15 can be carried out. The respective object lenses 7a, 7b are adapted so that their optical axes are caused to be in parallel to the support shaft 15. In addition, the respective object lenses 7a, 7b are disposed at positions substantially symmetrical with the bearing hole 37 being as center at the position (in the state) spaced from the bearing hole 37. Accordingly, when the lens bobbin 8 is caused to undergo movement operation relative to the support shaft 15, the respective object lenses 7a, 7b are caused to undergo movement operation in the optical axis direction of these object lenses 7a, 7b, i.e., in the focus direction indicated by arrow F in FIG. 9 and in a direction perpendicular to the optical axis of these object lenses 7a, 7b and the tangential line of the recording tracks, i.e., in the tracking direction as indicated by arrow T in FIG. 9.

Moreover, at the lens bobbin 8, focus drive coil 12 and tracking drive coils 13, 13 which are respectively driving coils are attached. The focus drive coil 12 is disposed in the state wound on the outer circumferential surface of the lens bobbin 8 with the winding axis direction being as the axial direction of the support shaft 15. Moreover, the tracking drive coils 13, 13 are adapted so that a pair of tracking drive coils are attached at the both side side surface portions of the lens bobbin 8 with the winding axis direction being as the radial direction of the lens bobbin 8. These tracking drive coils 13, 13 are disposed at positions symmetrical with each other with the support shaft 15 being as center.

Figure 12:
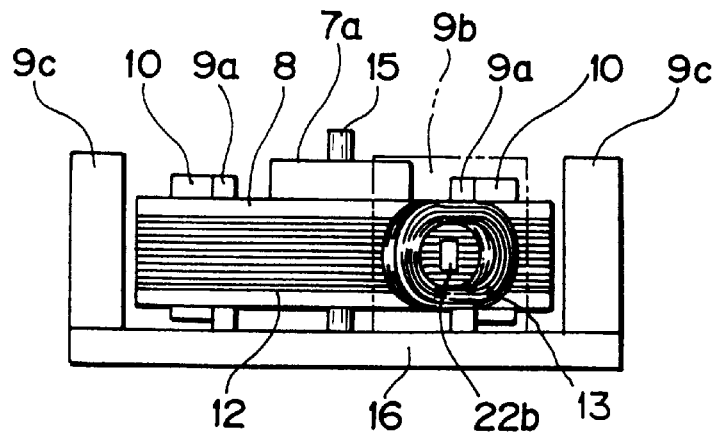
FIG. 12 is a side view showing the configuration of the biaxial actuator shown in FIG. 9.

At the side surface portion of the lens bobbin 8, as shown in FIG. 12, central point maintaining contact pieces 22b for tracking are respectively attached in the state positioned substantially at the central portions of the tracking drive coils 13, 13. This tracking central point maintaining contact piece 22b is formed by magnetic material.

Figure 11:
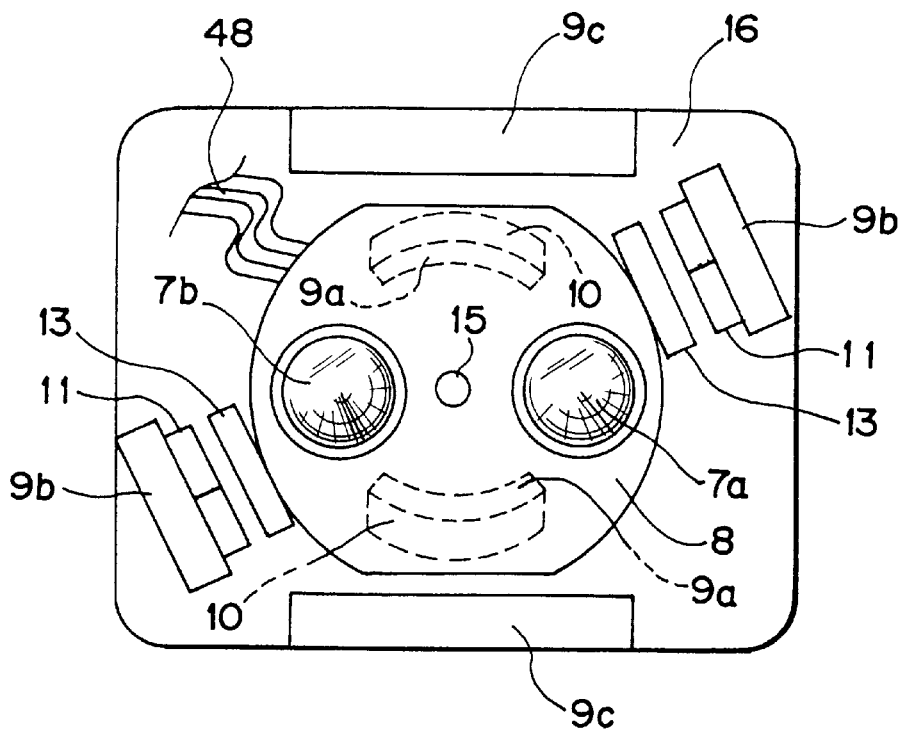
FIG. 11 is a plan view showing the configuration of the biaxial actuator shown in FIG. 9.

Further, the biaxial actuator 19 is constituted so as to form a magnetic circuit for allowing the respective drive coils 12, 13, 13 to be positioned within magnetic field. This magnetic circuit consists of a pair of inside focus drive yokes 9a, 9a, a pair of outside focus drive yokes 9c, 9c and a pair of tracking drive yokes 9b, 9b respectively vertically provided on the base plate 16, and two pairs of magnets 10, 10, 11, 11 attached in correspondence with the inside focus drive yokes 9a, 9a and tracking drive yokes 9b, 9b. The yokes 9a, 9a, 9c, 9c, 9b, 9b are respectively formed integrally with the base plate 16 by allowing a portion of the base plate 16 consisting of magnetic material to be partially bent toward the upper side. The pair of inside focus drive yokes 9a, 9a are disposed at the inside relative to the outer circumferential wall of the lens bobbin 8. Namely, as shown in FIG. 11, the inside focus drive yokes 9a, 9a are disposed in such a manner that they are admitted from the lower side of the lens bobbin 8 toward the internal side of the focus drive coil 12. These inside focus drive yokes 9a, 9a are formed so as to take circular arc form (shape which is a portion of cylinder) corresponding to the outer circumferential side surface portion of the lens bobbin 8. Further, the pair of outside focus drive yokes 9c, 9c are disposed at the outside relative to the outer circumferential wall of the lens bobbin 8. Further, the pair of inside focus drive yokes 9a, 9a and the pair of outside focus drive yokes 9c, 9c are respectively opposed. In addition, the tracking drive yokes 9b, 9b are respectively positioned at the external side of the lens bobbin 8, and are adapted to allow the principal surface portions facing to the central side of the base plate 16 to be opposite to the outer circumferential side side surface portion of the lens bobbin 8.

The focus drive magnets 10, 10 are attached to the side surface portion of the side of the outside of the respective inside focus drive yokes 9a, 9a. Further, the tracking drive magnets 11, 11 are attached in correspondence with the principal surface portions facing to the central side of the base plate 16 of the tracking drive yokes 9b, 9b. The respective focus drive magnets 10, 10 are adapted so that one (single) pole magnetization is implemented on one side surface, and the respective tracking drive magnets 11, 11 are adapted so that two (double) pole magnetization is implemented on one side surface. These magnets 10, 10, 11, 11 are adapted so that magnetic poles are opposed in correspondence with the focus drive coil 12 and the tracking drive coils 13, 13 to place the focus drive coil 12 and the tracking drive coils 13, 13 within magnetic field produced by these magnetic poles.

Magnetic field that the focus drive magnets 10, 10 attached to the respective inside focus drive yokes 9a, 9a form is radial magnetic field which traverses the focus drive coil 12 in the radial direction of the lens bobbin 8 and reaches the outside focus drive yokes 9c, 9c. Moreover, magnetic field that the tracking drive magnets 11, 11 attached to the respective tracking drive yokes 9b, 9b form is loop-shaped magnetic field ranging from the (side of) one side to (the side of) the other side of these tracking drive magnets 11, 11.

In the biaxial actuator 19, when drive current is delivered to the focus drive coil 12, the lens bobbin 8 undergoes action from the magnetic field that the magnetic circuit forms so that it is caused to undergo movement operation in the axial direction of the support shaft 15, i.e., in the focus direction, i.e., in the optical axis direction of the object lenses 7a, 7b as indicated by F in FIG. 9. Moreover, in this biaxial actuator, when drive current is delivered to the tracking drive coils 13, 13, the lens bobbin 8 undergoes action from the magnetic field that the magnetic circuit forms so that it is rotated about the axis of the support shaft 15 to allow the object lenses 7a, 7b to undergo in the tracking direction, i.e., in a direction perpendicular to the optical axis of the object lenses 7a, 7b.

Namely, this biaxial actuator 19 is adapted so that when the focus drive coil 12 is supplied with focus drive current based on the focus error signal, it allows the respective object lenses 7a, 7b to undergo movement operation in a manner to follow plane vibration of the optical discs 101, 102. Moreover, this biaxial actuator 19 is adapted so that when the tracking drive coils 13, 13 are supplied with tracking drive current based on the tracking error signal, it allows the respective object lenses 7a, 7b to undergo movement operation in a manner to follow eccentricity of recording tracks of the optical discs 101, 102.

In addition, in this biaxial actuator 19, the tracking central point maintaining contact pieces 22b are attracted to the position where the magnetic flux density is maximum of magnetic field that the tracking drive magnet 11 forms, whereby the coil bobbin 8 is held at the central point with respect to the tracking direction.

[7] Another form (2) of the configuration of the biaxial actuator

Figure 13:
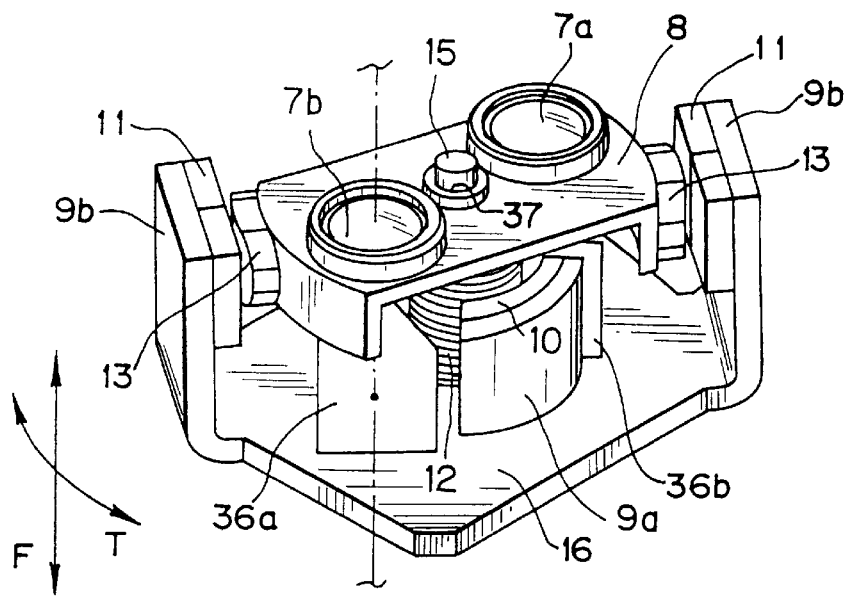
FIG. 13 is a perspective view showing another example of the configuration of the optical pick-up according to this invention.
Figure 14:
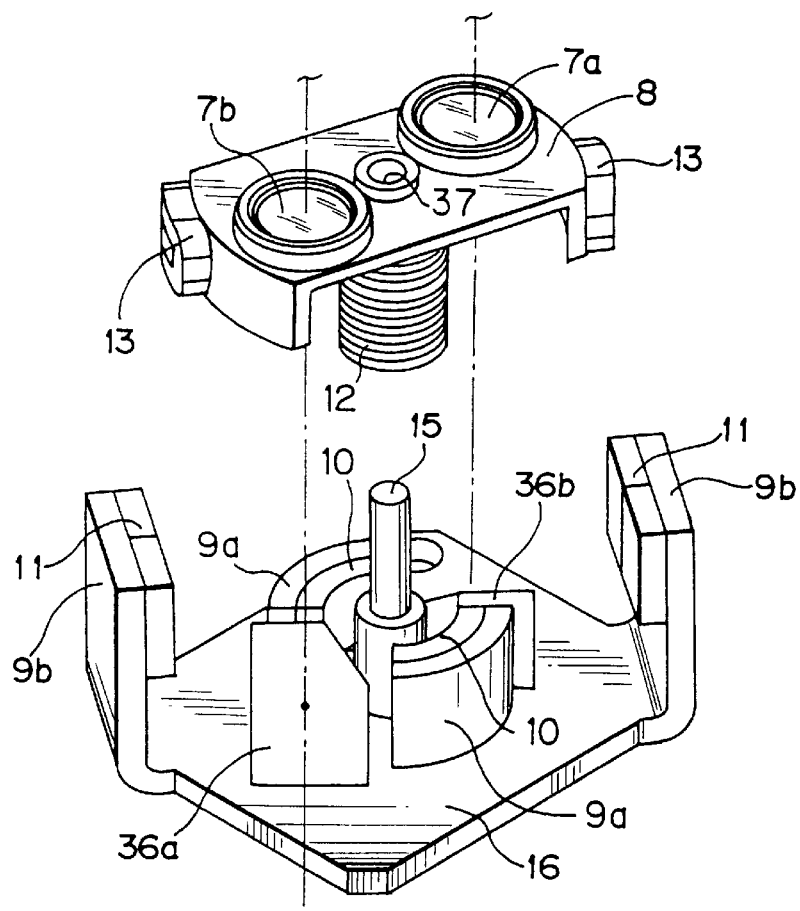
FIG. 14 is an exploded perspective view showing the configuration of the biaxial actuator shown in FIG. 13.

In the optical pick-up according to this invention, as shown in FIGS. 13 and 14, the above-mentioned biaxial actuator 19 may be of a structure comprising focus coil 12 wound at the lower portion of the coil bobbin 8.

This biaxial actuator 19 also supports, similarly to the above-described biaxial actuator, the first and second object lenses 7a, 7b so that they are permitted to undergo movement operation in the optical axis direction of these respective object lenses 7a, 7b, i.e., in the focus direction indicated by arrow F in FIG. 13 and in the direction perpendicular to the optical axis, i.e., in the tracking direction indicated by arrow T in FIG. 13. These object lenses 7a, 7b are opposed to the signal recording layer of each of the optical discs 101, 102 loaded on the disc table 25 by allowing the optical pick-up 19 to be attached on the optical block 17, and are caused to undergo movement operation along the inner and outer circumferential directions of the optical discs 101, 102 by allowing the optical system block 17 to undergo movement operation along the guide shaft 23 and the support shaft 24. The first and second object lenses 7a, 7b are arranged in the direction substantially perpendicular to the length direction of the guide shaft 23, i.e., in the circumferential direction of each of the optical discs 101, 102 loaded on the disc table 25.

This biaxial actuator 19 includes, as shown in FIGS. 13 and 14, columnar support shaft 15 substantially vertically provided on the base plate 16. Further, this biaxial actuator 19 includes substantially disc-shaped lens bobbin 8 serving as a movable portion on which the respective object lenses 7a, 7b are attached. This lens bobbin 8 includes a bearing hole 37 at the central portion thereof, and is adapted to allow the support shaft 15 to be inserted through the bearing hole 37, whereby it is supported by the support shaft 15 in the state where slide in the axial direction of the support shaft 15 and rotation around the axis of the support shaft 15 can be carried out. The respective object lenses 7a, 7b are adapted so that their optical axes are caused to be in parallel to the support shaft 15. Moreover, the respective object lenses 7a, 7b are disposed at positions substantially symmetrical with the bearing hole 37 being as center at the position (in the state) spaced from the bearing hole 37. Accordingly, when the lens bobbin 8 is caused to undergo movement operation relative to the support shaft 15, the respective object lenses 7a, 7b are caused to undergo movement operation in the optical axis direction of these object lenses 7a, 7b indicated, i.e., in the focus direction by arrow F in FIG. 13 and in the direction perpendicular to the optical axis of these object lenses 7a, 7b and the tangential line of the recording track, i.e., in the tracking direction indicated by arrow T in FIG. 13.

Further, focus drive coil 12 and tracking drive coils 13, 13 which are respectively drive coils are attached to the lens bobbin 8. The focus drive coil 12 is disposed in the state wound on the outer circumferential surface of the lens bobbin 8 with the winding axis direction being as the axial direction of the support shaft 15. In addition, the tracking drive coils 13, 13 are adapted so that a pair of tracking drive coils are attached to the both side side surface portions of the lens bobbin 8 with the winding axis direction being as the radial direction of the lens bobbin 8. These tracking drive coils 13, 13 are disposed at positions symmetrical with each other with the support shaft 15 being as the center.

Further, this biaxial actuator 19 is constituted so as to form a magnetic circuit for allowing the respective drive coils 12, 13, 13 to be positioned within magnetic field. This magnetic circuit consists of a pair of focus drive yokes 9a, 9a and a pair of tracking drive yoke 9b, 9b vertically provided on the base plate 16, and two pairs of magnets 10, 10, 11, 11 attached in correspondence with these yokes 9a, 9a, 9b, 9b. The respective yokes 9a, 9a, 9b, 9b are formed integrally with the base plate 16 by allowing a portion of the base plate 16 consisting of magnetic material to be bent toward the upper side. The focus drive yokes 9a, 9a are disposed so as to surround the external side of the focus drive coil 12 from the lower side of the lens bobbin 8. These focus drive yokes 9a, 9a are formed so as to take circular arc form (shape which is a portion of cylinder) corresponding to the outer circumferential side surface portion of the lens bobbin 8. Further, the tracking drive yokes 9b, 9b are respectively positioned at the external side of the lens bobbin 8, and are adapted so that their principal surface portions facing to the central side of the base plate 16 are opposed to the outer circumferential side side surface portion of the lens bobbin 8.

The focus drive magnets 10, 10 are attached to the side surface portion of the side of the inside of the respective focus drive yokes 9a, 9a. Further, the tracking drive magnets 11, 11 are attached in correspondence with the principal surface portions facing to the central side of the base plate 16 of the tracking drive yokes 9b, 9b. The respective focus drive magnets 10, 10 are adapted so that one (single) pole magnetization is implemented on one side surface, and the tracking drive magnets 11, 11 are adapted so that two (double) pole magnetization is implemented on one side surface. These magnets 10, 10, 11, 11 are adapted to allow the magnetic poles to be opposite to each other in correspondence with the focus drive coil 12 and the tracking drive coils 13, 13 to allow the focus drive coil 12 and the tracking drive coils 13, 13 to be positioned within magnetic field produced by these magnetic poles.

Magnet field that the focus drive magnets 10, 10 attached to the respective focus drive yokes 9a, 9a form is radial magnetic field traversing the focus drive coil 12 in the radial direction of the lens bobbin 8. Moreover, magnetic field that tracking drive magnets 11, 11 attached to the respective tracking drive yokes 9b, 9b form is magnetic field in a loop form ranging from (the side of) one side to (the side of) the other side of these tracking drive magnets 11, 11.

In this biaxial actuator 19, when drive current is delivered to the focus drive coil 12, the lens bobbin 8 undergoes action from the magnetic field that the magnetic circuit forms so that it is caused to undergo movement operation in the axial direction of the support shaft 15, i.e., in the focus direction (in the optical axis direction of the object lenses 7a, 7b) as indicated by arrow F in FIG. 13. Moreover, in this biaxial actuator, when drive current is delivered to the tracking drive coils 13, 13, the lens bobbin 8 undergoes action from the magnetic field that the magnetic circuit forms so that it is rotated around the axis of the support shaft 15 as indicated by arrow T in FIG. 13 to allow the object lenses 7a, 7b to undergo movement operation in the tracking direction (in the direction perpendicular to the optical axis of the object lenses 7a, 7b).

Namely, this biaxial actuator 19 is adapted so that the focus drive coil 12 is supplied with focus drive current based on the focus error signal to allow the respective object lenses 7a, 7b to undergo movement operation in a manner to follow the plane vibration of the optical discs 101, 102. Moreover, this biaxial actuator 19 is adapted so that the tracking drive coils 13, 13 are supplied with tracking drive current based on the tracking error signal to allow the respective object lenses 7a, 7b to undergo movement operation in a manner to follow the eccentricity of recording tracks of the optical discs 101, 102.

[8] Further form (3) of the configuration of the biaxial actuator

In the optical pick-up according to this invention, as shown in FIGS. 15 to 19, the biaxial actuator 19 may be caused to be of a structure in which the lens bobbin 8 is movably supported by leaf springs 49.

Figure 15:
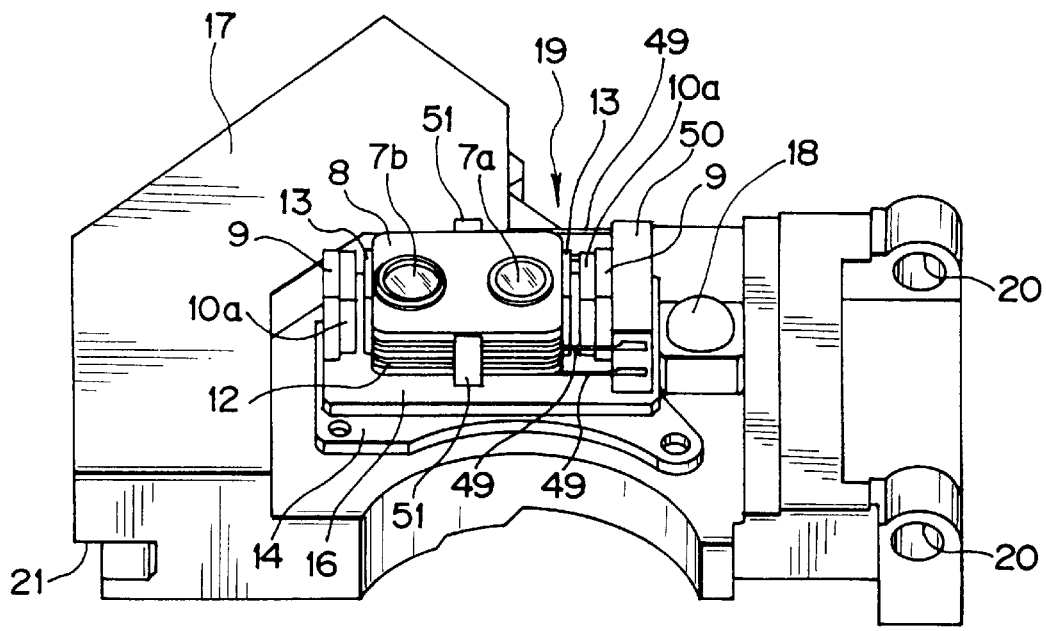
FIG. 15 is a perspective view showing a further example of the configuration of the optical pick-up according to this invention.
Figure 16:
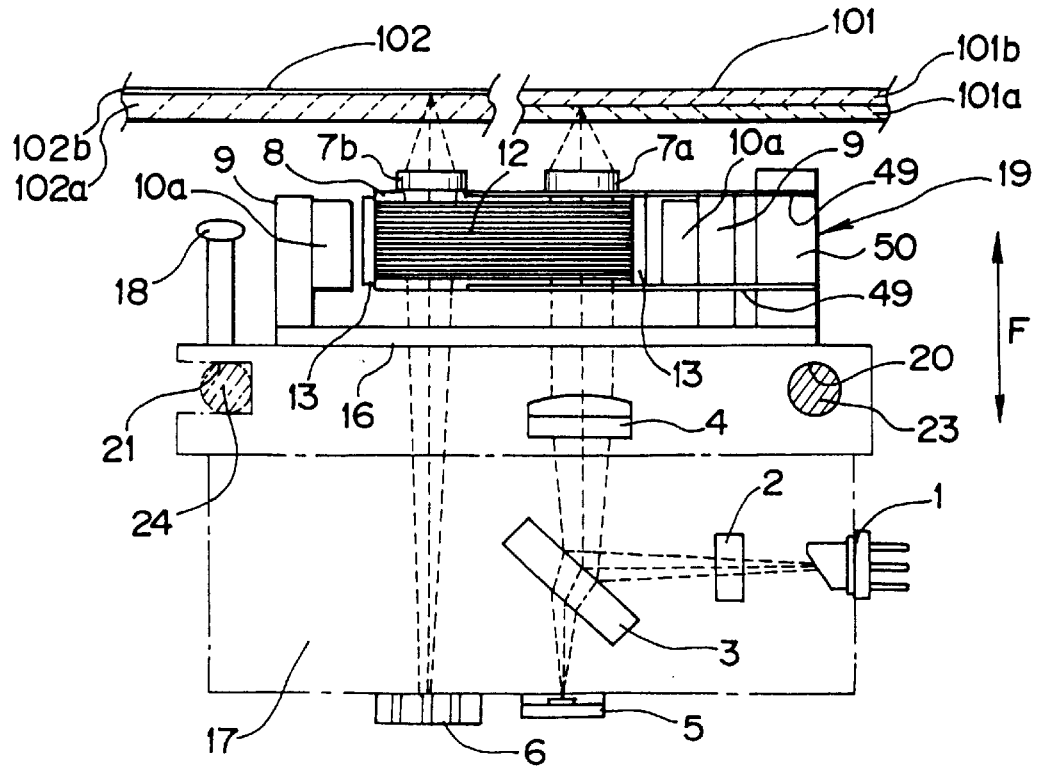
FIG. 16 is a longitudinal cross sectional view showing the configuration of the optical pick-up shown in FIG. 15.
Figure 19:
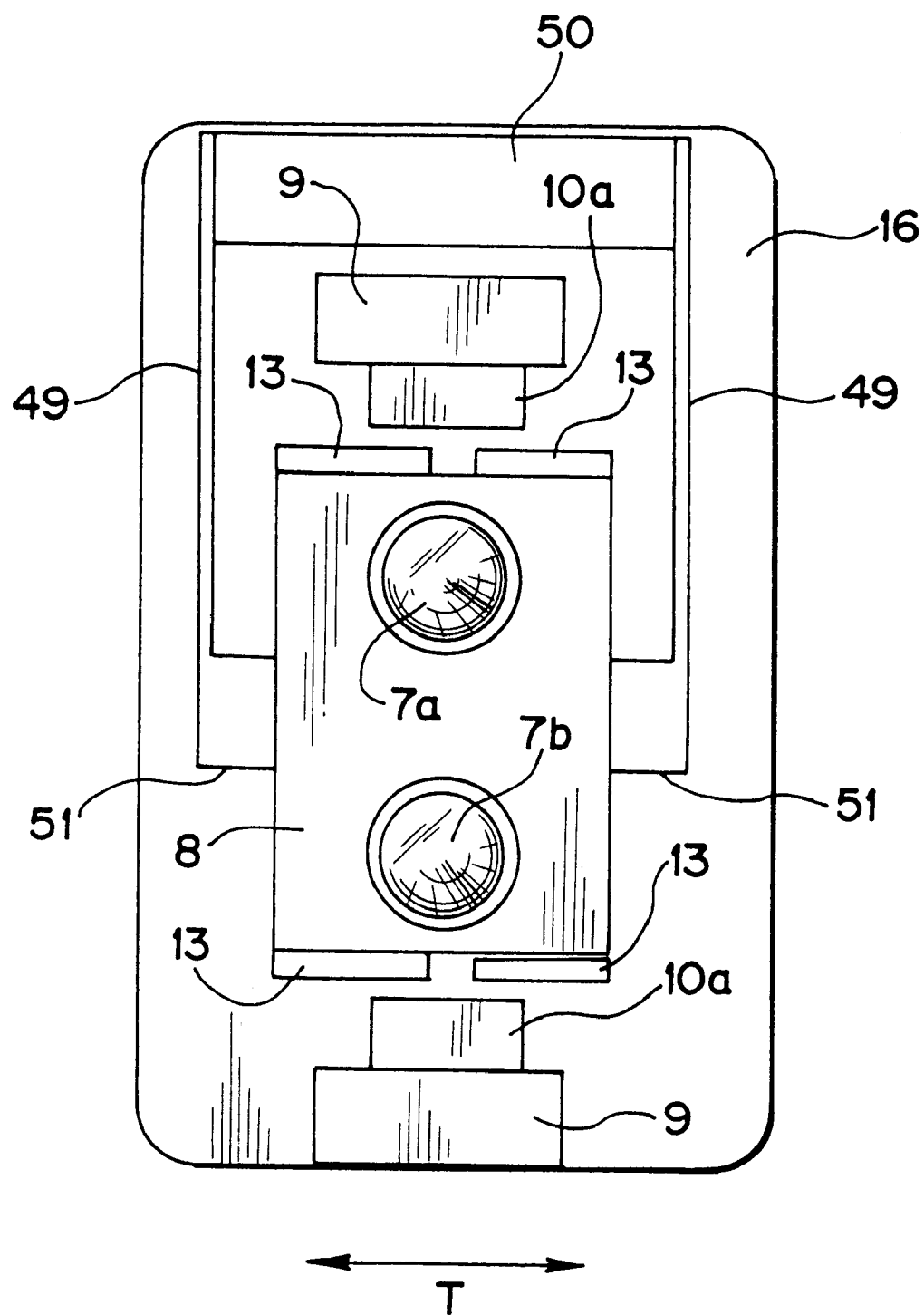
FIG. 19 is a plan view showing the configuration of the biaxial actuator shown in FIG. 15.

This biaxial actuator 19 also supports, similarly to the above-described biaxial actuators, the first and second object lens 7a, 7b so that they are permitted to undergo movement operation in the optical axis direction of these respective object lenses 7a, 7b, i.e., in the focus direction indicated by arrow F in FIG. 16, and in the direction perpendicular to the optical axis, i.e., in the tracking direction indicated by the arrow T in FIG. 19. As shown in FIGS. 15 and 16, these object lenses 7a, 7b are opposed to the signal recording layer of each of the optical discs 101, 102 loaded on the disc table 25 by allowing the optical pick-up 19 to be attached on the optical block 17, and are caused to undergo movement operation along the inner and outer circumferential directions of the optical discs 101, 102 by allowing the optical system block 17 to undergo movement operation along the guide shaft 23 and the support shaft 24. The first and second object lenses 7a, 7b are arranged in the direction substantially perpendicular to the length direction of the guide shaft 23, i.e., in the circumferential direction of the optical discs 101, 102 loaded on the disc table 25.

Figure 17:
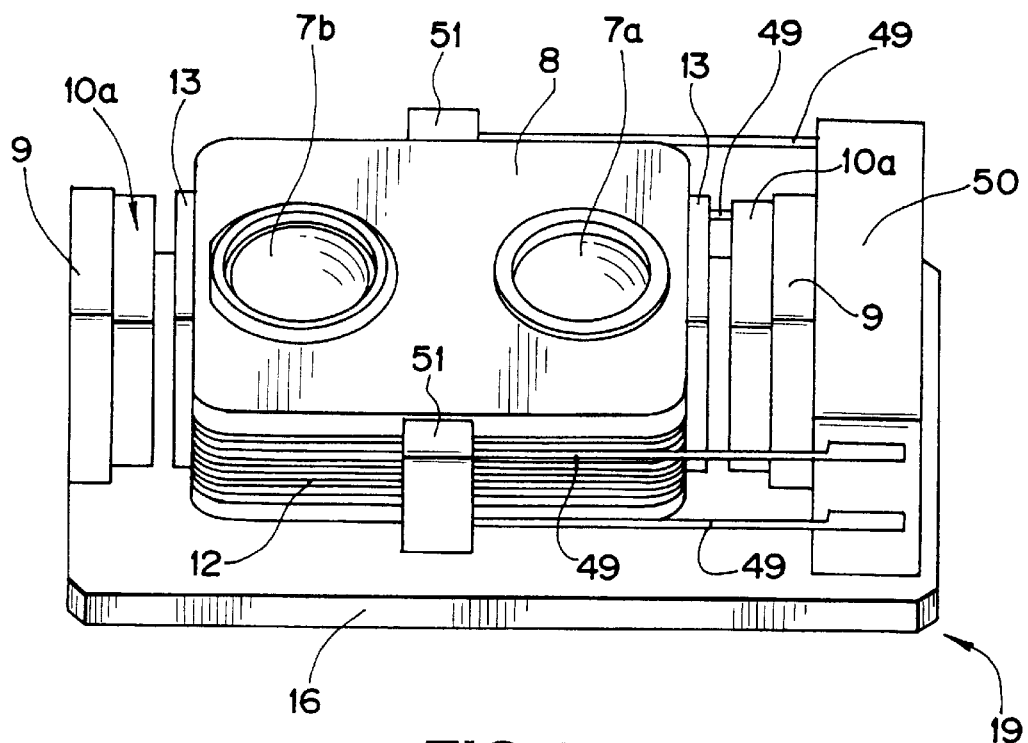
FIG. 17 is a perspective view showing the configuration of the biaxial actuator serving as the essential part of the optical pick-up shown in FIG. 15.
Figure 18:
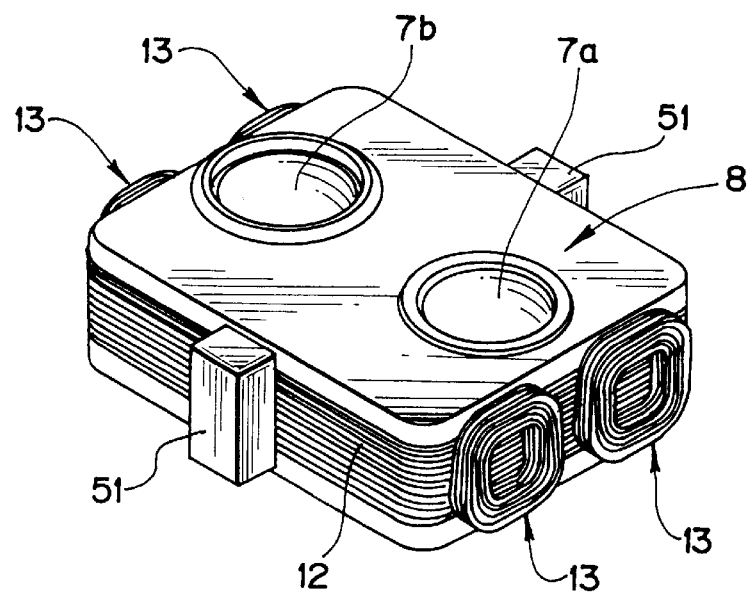
FIG. 18 is a perspective view showing the configuration of movable portion serving as the essential part of the biaxial actuator shown in FIG. 15.

This biaxial actuator 19 includes, as shown in FIGS. 17 and 18, substantially rectangular lens bobbin 8 serving as a movable portion on which the respective object lenses 7a, 7b are attached. The respective object lenses 7a, 7b are adapted so that their optical axes are caused to be in parallel to each other. This lens bobbin 8 is movably attached in the focus direction and in the tracking direction with respect to a fixed block 50 disposed in the state positioned at the backward side of the lens bobbin 8 on the base plate 16 by four leaf springs 49, 49, 49, 49 in parallel to each other. Namely, the respective two pairs of leaf springs 49 are adapted so that the base end sides are respectively attached to the fixed block 50 and the front end sides are attached in correspondence with spring attachment portions 51, 51 provided at the both side portions of the lens bobbin 8. The respective leaf springs 49 are caused to respectively undergo curved displacement to thereby move the lens bobbin 8 in the focus direction indicated by arrow F in FIG. 16 and in the tracking direction indicated by arrow T in FIG. 19 without inclining the lens bobbin 8.

Moreover, focus drive coil 12 and tracking drive coils 13 13 which are respectively drive coils are attached to the lens bobbin 8. The focus drive coil 12 is disposed in the state wound on the outer circumferential surface of the lens bobbin 8 with the winding axis direction thereof being as the optical axis direction of the respective object lenses 7a, 7b. Moreover, the tracking drive coils 13, 13 are attached by one pair at the front end surface and the backward end surface of the lens bobbin 8, with winding axis directions being in parallel to each other, in the direction perpendicular to the optical axis of the respective object lenses 7a, 7b.

Further, this biaxial actuator 19 is constituted so as to form a magnetic circuit for placing the respective drive coils 12, 13, 13 within magnetic field. This magnetic circuit consists of a pair of yokes 9, 9 respectively vertically provided in the state positioned before and after the lens bobbin 8 on the base plate 16, and a pair of magnets 10a, 10a attached in correspondence with these yokes 9, 9. The yokes 9, 9 are adapted so that a portion of the base plate 16 consisting of magnetic material is bent toward the upper side so that it is formed integrally with the base plate 16 thus to allow the principal surface portions facing to the central side of the base plate 16 to be opposite to the front end surface and the back end surface of the lens bobbin 8.

The magnets 10a, 10a are attached at the side surface portions of the side of inside of the respective yokes 9, 9. Further, these magnets 10a, 10a are adapted so that one (single) pole magnetization is implemented on one side surface, and one magnetic poles are opposed to each other in correspondence with the forward portion and the backward portion of the focus drive coil 12 and the tracking drive coils 13, 13 thus to place the focus drive coil 12 and the tracking drive coils 13, 13 within magnetic field produced from the magnetic poles.

Magnetic field that magnets 10a, 10a attached to the respective yokes 9, 9 form is linear magnetic field which traverses the focus drive coil 12 and the tracking drive coils 13, 13 in before and after directions of the lens bobbin 8.

In this biaxial actuator 19, when drive current is delivered to the focus drive coil 12, the lens bobbin 8 undergoes action from magnetic field that the magnetic circuit forms so that it is caused to undergo movement operation in the focus direction, i.e., in the optical axis direction of the object lenses 7a, 7b as indicated by arrow F in FIG. 16. Moreover, in this biaxial actuator, when drive current is delivered to the tracking drive coils 13, 13, the lens bobbin 8 undergoes action from magnetic field that the magnetic circuit forms so that it is caused to undergo movement operation in the tracking direction, i.e., in the direction perpendicular to the optical axis of the object lenses 7a, 7b as indicated by arrow T in FIG. 19.

Namely, this biaxial actuator 19 is adapted so that the focus drive coil 12 is supplied with focus drive current based on the focus error signal to allow the respective object lenses 7a, 7b to undergo movement operation in a manner to follow plane vibration of the optical discs 101, 102. Moreover, this biaxial actuator 19 is adapted so that the tracking drive coils 13, 13 are supplied with tracking drive current based on the tracking error signal to allow the respective object lenses 7a, 7b to undergo movement operation in a manner to follow eccentricity of recording tracks of the optical discs 101, 102.

Further, this optical pick-up may be constituted so that in the case where there is less margin with respect to angle formed by the tracking direction with respect to one of the first and second object lenses 7a, 7b and the normal line of recording track at the position where this object lens is opposite thereto, i.e., in the case where angle formed by the tracking direction and the normal line becomes great so that it becomes impossible to precisely detect tracking error signal, when the optical system block 17 is caused to undergo movement operation, one object lens is moved on the line passing through the center of each of the optical discs 101, 102 and the other object lens is moved on the line spaced by a predetermined distance with respect to the center of each of the optical discs 101, 102.

The case where there is less margin with respect to angle formed by the tracking direction and the normal line of recording track at the position where the object lens is opposite thereto is, e.g., the case where the tracking error signal is not detected by the so-called three beam method. Moreover, the case where there is margin with respect to angle formed by the tracking direction and the normal line of the recording track at the position where the object lens is opposite thereto is, e.g., the case where tracking error signal is detected by the so-called three beam method.

Figure 23:
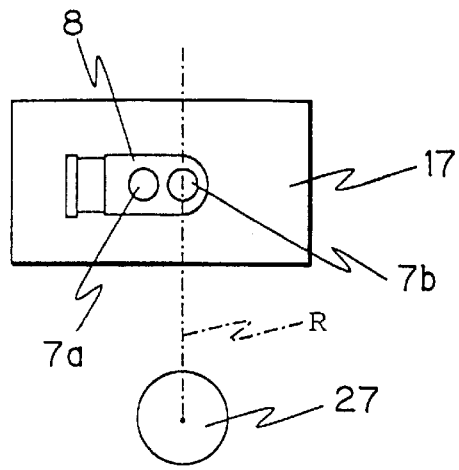
FIG. 23 is a plan view showing the positional relationship between the optical pick-up and disc-shaped optical recording medium in the above-mentioned disc player, wherein the state where one object lens is located on the radius line of the disc-shaped optical recording medium is shown.

For example, in this optical pick-up, in the case where there is margin with respect to angle formed by the first tracking direction with respect to the first object lens 7a and the normal line of recording track at the position where the first object lens 7a is opposite thereto, there may be employed a configuration as shown in FIG. 23 such that the second object lens 7b is caused to undergo movement operation while maintaining the opposite relationship with respect to the line R passing through the center of each of the optical discs 101, 102 and in parallel to the movement direction of the optical system block 17, and the first object lens 7a is caused to undergo movement operation in parallel to the second object lens 7b while maintaining the opposite relationship in respect of the line spaced by a predetermined distance with respect to the center of each of the optical discs 101, 102.

In this case, in the biaxial actuator 19, angle formed by the first tracking direction which is the movement operation direction of the first object lens 7a and the tangential line of the recording track at the position where the first object lens 7a is opposite thereto does not equal to 90 degrees. Namely, in this biaxial actuator 19, the first tracking direction and the normal line of the recording track at the position where the first object lens 7a is opposite thereto form an angle.

Figure 24:
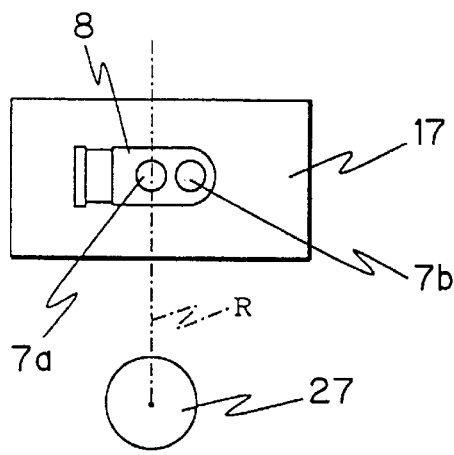
FIG. 24 is a plan view showing the positional relationship between the optical pick-up and the disc-shaped optical recording medium in the above-mentioned disc player, wherein the state where the other object lens is located on the radius line of the disc-shaped optical recording medium is shown.

Further, in the case where there is margin with respect to angle formed by the second tracking direction with respect to the second object lens 7b and the normal line of recording track at the position where the second object lens 7b is opposite thereto, there may be employed an approach as shown in FIG. 24 in which the first object lens 7a is caused to undergo movement operation while maintaining the opposite relationship with respect to the line R passing through the center of each of the optical discs 101, 102 and in parallel to the movement direction of the optical system block 17, and the second object lens 7b is caused to undergo movement operation in parallel to the first object liens 7a while maintaining the opposite relationship with respect to the line spaced by a predetermined distance relative to the center of each of the optical discs 101, 102.

In this case, in the biaxial actuator 19, angle formed by the second tracking direction which is movement operation direction of the second object lens 7b and the tangential line of the recording track at the position where the second object lens 7b is opposite thereto does not equal to 90 degrees. Namely, in this biaxial actuator 19, the second tracking direction and the normal line of the recording track at the position where the second object lens 7b is opposite thereto form an angle.

Figure 21:
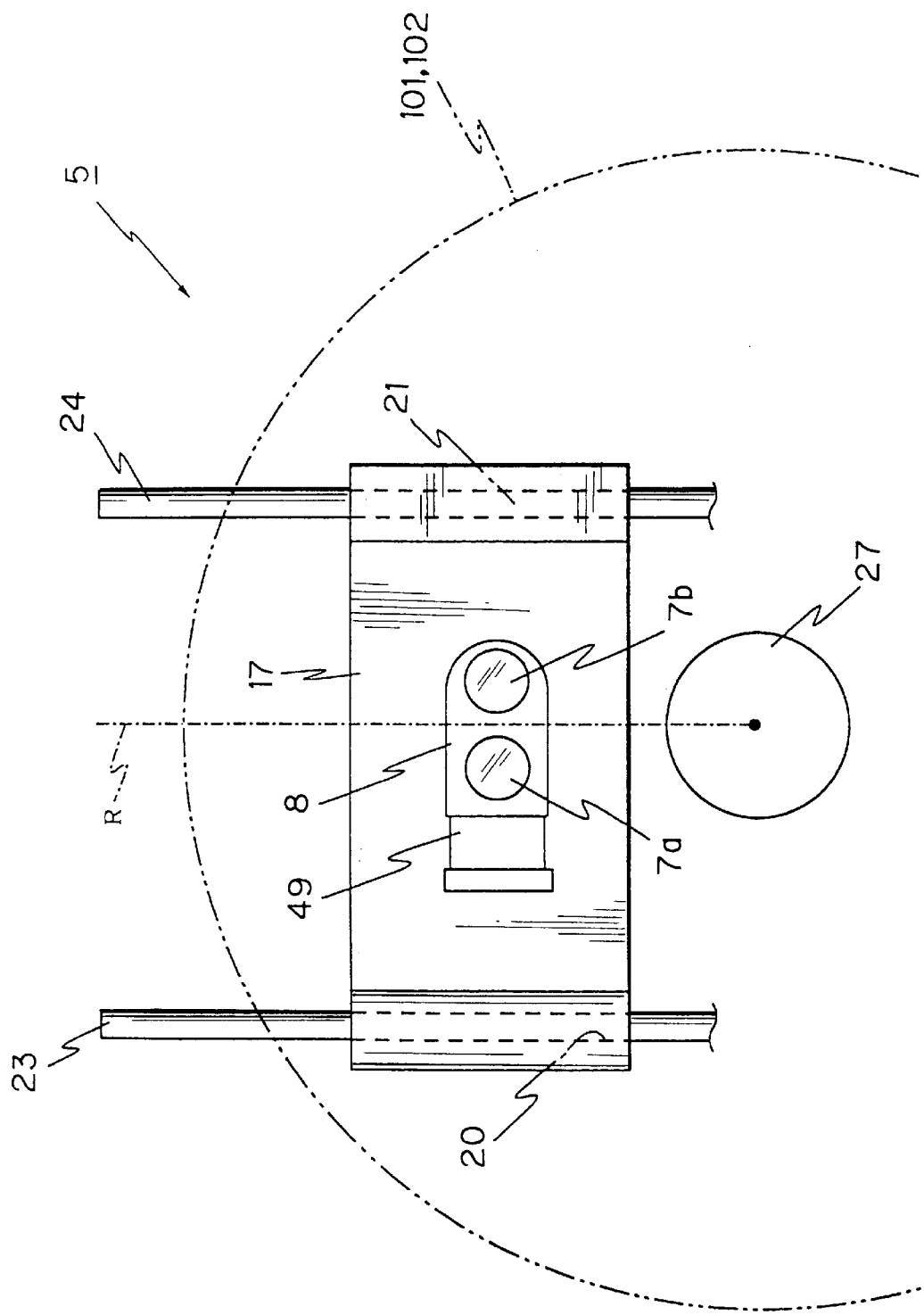
FIG. 21 is a plan view showing the configuration of the optical pick-up shown in FIG. 20.

Further, in this optical pick-up, in the case where there are margins to the same degree with respect to angle formed by the first tracking direction and the normal line of recording track at the position where the first object lens 7a is opposite thereto and angle formed by the second tracking direction and the normal line of recording track at the position where the second object lens 7b is opposite thereto, there may be employed, as shown in FIG. 21, a configuration in which the first and second object lenses 7a, 7b are arranged in the circumferential direction of the optical discs 101, 102, and the line R passing through the center of each of the optical discs 101, 102 and in parallel to movement direction of the optical system block 17 is caused to be passed between these respective object lenses 7a, 7b.

In this case, in the biaxial actuator 19, angle formed by the first tracking direction and the tangential line of the recording track at the position where the first object lens 7a is opposite thereto and angle formed by the second tracking direction and the tangential line of the recording track at the position where the second object lens 7b is opposite thereto respectively do not equal to 90°. Namely, in this biaxial actuator 19, the first and second tracking directions and the normal lines of the recording tracks at the positions where the first and second object lenses 7a, 7b are opposite thereto respectively form angles.

Figure 25:
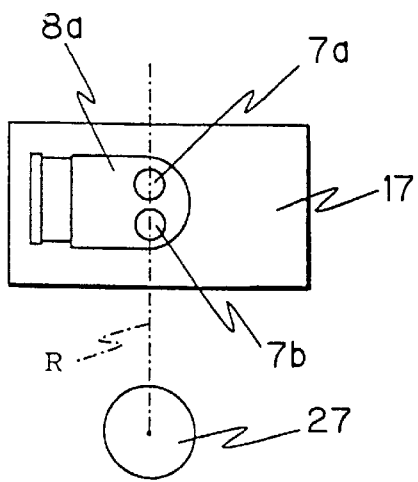
FIG. 25 is a plan view showing the positional relationship between the optical pick-up and the disc-shaped optical recording medium in the above-mentioned disc player, wherein the state where respective object lenses are located on the radius line of the disc-shaped optical recording medium is shown.

Further, this optical pick-up may be constituted so that in the case where there are not respectively margins with respect to angle formed by the first tracking direction and the normal line of recording track at the position where the first object lens 7a is opposite thereto and angle formed by the second tracking direction and the normal line of recording track at the position where the second object lens 7b is opposite thereto, there may be employed, as shown in FIG. 25, a configuration in which the first and second object lenses 7a, 7b are arranged in the radial direction of the optical discs 101, 102, and these respective object lenses 7a, 7b are caused to undergo movement operation while maintaining the opposite relationship with respect to the line passing through the center of each of the optical discs 101, 102 and in parallel to movement direction of the optical system block 17.

In this case, in the biaxial actuator 19, angle formed by the first tracking direction and the tangential line of the recording track at the position where the first object lens 7a is opposite thereto, and angle formed by the second tracking direction and the tangential line of the recording track at the position where the second object lens 7b is opposite thereto respectively become equal to 90°. Namely, in this biaxial actuator 19, the first and second tracking directions and the normal lines of the recording tracks at the positions where the first and second object lenses 7a, 7b are opposite thereto are respectively in correspondence with each other.

What is claimed is:

1. An optical pick-up comprising:
   a biaxial actuator for supporting first and second object lenses on the same movable portion in a state where optical axes of said first and second object lenses are parallel to each other, and for allowing the movable portion to undergo movement to thereby move said first and second object lenses in an optical axis direction and in a direction perpendicular to the optical axis, said first and second object lenses each having a numerical aperture;
   a first light source for allowing light beams to be incident to said first object lens through a first optical path; and
   a second light source for allowing light beams to be incident to said second object lens through a second optical path,
   wherein the numerical aperture of said first object lens is greater than the numerical aperture of said second object lens, and
   wherein light beams emitted from said first light source are irradiated onto a signal recording layer of a disc-shaped optical recording medium in a direction substantially perpendicular thereto to converge the light beams on the signal recording layer by said first object lens, or light beams emitted from said second light source are irradiated onto the signal recording layer of the disc-shaped optical recording medium in the direction substantially perpendicular thereto to converge the light beams on the signal recording layer by said second object lens, thus to carry out write or read operation of information signals with respect to the disc-shaped optical recording medium.

2. An optical pick-up as set forth in claim 1, wherein said first and second light sources emit rays of light having wavelengths which are different from each other.

3. An optical pick-up as set forth in claim 2, wherein the wavelength of the rays of light emitted by said first light source is 635 nm to 650 nm, and the wavelength of the rays of light emitted by the second light source is 780 nm.

4. An optical pick-up as set forth in claim 1, wherein the numerical aperture of said first object lens is 0.6, and the numerical aperture of said second object lens is 0.45 or less.

5. An optical pick-up as set forth in claim 1, wherein said first and second object lenses are arranged in a circumferential direction of the disc-shaped optical recording medium, and are disposed proximate each other in a state where one line passing through the center of the disc-shaped optical recording medium is put therebetween.

6. An optical pick-up as set forth in claim 1, wherein when an optical system block for supporting said biaxial actuator is caused to relatively undergo movement in a direction toward the central portion of the disc-shaped optical recording medium or away therefrom, either any one of said first and second object lenses moves opposite to a line passing through the central portion of the disc-shaped optical recording medium and in parallel to a relative movement direction between the optical system block and the disc-shaped optical recording medium.

7. An optical pick-up as set forth in claim 1, wherein any one of said first and second object lenses moving opposite with respect to a line passing through the center of the disc-shaped optical recording medium and in parallel to a relative movement direction between the optical system block and the disc-shaped optical recording medium when the optical block system is caused to relatively undergo movement in a direction toward the central portion of the disc-shaped optical recording medium or away therefrom has a numerical aperture greater than that of the other object lens.

8. An optical pick-up as set forth in claim 1, wherein when an optical system block for supporting said biaxial actuator is caused to relatively undergo movement in a direction toward the central portion of the disc-shaped optical recording medium or away therefrom, said first and second object lenses move opposite to a line passing through the central portion of the disc-shaped optical recording medium and parallel to a relative movement direction between the optical system block and the disc-shaped optical recording medium.

9. An optical pick-up as set forth in claim 8, wherein the other object lens positioned at an outer circumferential side of the disc-shaped optical recording medium relative to one of said first and second object lenses has a numerical aperture smaller than that of the one object lens.

10. An optical pick-up as set forth in claim 1, wherein the movable portion of said biaxial actuator includes a bearing hole through which a columnar support shaft is inserted, and said support shaft is inserted through the bearing hole, whereby the movable portion is supported by said support shaft so that it can be moved in an axial direction of said support shaft and in a direction around an axis of said support shaft; and a drive coil is attached to the movable portion to place said drive coil within a magnetic field formed by a magnetic circuit and said movable portion is caused to undergo movement by delivering drive current to said drive coil, and wherein said first and second object lenses are disposed on the movable portion at positions substantially symmetrical with said support shaft being at the center, and light beams from said light sources respectively corresponding thereto are incident thereto while they remain at substantially symmetrical positions with said support shaft being at the center.

11. An optical pick-up as set forth in claim 1, wherein the movable portion of the biaxial actuator is supported by leaf springs so that the movable portion can be moved by displacement of said leaf springs, and a drive coil is attached to the movable portion to place said drive coil within a magnetic field formed by a magnetic circuit, whereby when a drive current is delivered to said drive coil, the movable portion is caused to undergo movement.

12. An optical pick-up comprising:

a movable portion including a bearing hole through which a columnar support shaft is inserted, said movable portion being such that said support shaft is inserted through the bearing hole, whereby said movable portion is movably supported by said support shaft in an axial direction of said support shaft and in a direction around an axis of said support shaft, and such that a drive coil is attached to said movable portion to place said drive coil within a magnetic field formed by a magnetic circuit, whereby when drive current is delivered to said drive coil, said movable portion is caused to undergo movement;

first and second object lenses supported on said movable portion in a state where their optical axes are parallel to each other; and such that when said movable portion is caused to undergo movement, said first and second object lenses are moved in the optical axis direction and in a direction perpendicular to the optical axis;

a first light source for allowing light beams to be incident to said first object lens via a first optical path; and a second light source for allowing light beams having a wavelength different from that of light beams emitted from said first light source to be incident to said second object lens via a second optical path, wherein said first and second object lenses are disposed at substantially symmetrical positions with the bearing hole being at the center, and are adapted so that light beams from said light sources respectively corresponding thereto are caused to be incident while placing said first and second object lenses at substantially symmetrical positions with said support shaft being at the center, and wherein light beams emitted from said first light source are irradiated onto a signal recording layer of a disc-shaped optical recording medium in a direction substantially perpendicular thereto to converge the light beams onto the signal recording layer by said first object lens, or light beams emitted from said second light source are irradiated onto the signal recording layer of the disc-shaped optical recording medium in a direction substantially perpendicular thereto to converge the light beams onto the signal recording layer by said second object lens, thus to carry out write or read operation of information signals with respect to the disc-shaped optical recording medium.

13. An optical pick-up as set forth in claim 12, wherein the wavelength of light emitted by said first light source is 635 nm to 630 nm, and the wavelength of light emitted by said second light source is 780 nm.

14. An optical pick-up as set forth in claim 12, wherein said first object lens has a numerical aperture of 0.6 and said second object lens has a numerical aperture of 0.45 or less.

15. An optical pick-up as set forth in claim 12, wherein said drive coil attached to said movable portion is comprised of at least a pair of coils, whereby one of said coils and the magnetic circuit apply, to said movable portion, a drive force in a direction to allow the respective object lenses to be moved in the optical axis direction, and the other of said coils and the magnetic circuit apply, to said movable portion, a drive force in a direction to allow the respective object lenses to be moved in the direction perpendicular to the optical axis.

16. An optical pick-up as set forth in claim 15, wherein said pair of coils are attached to a plane in parallel to the optical axis of each of said object lenses formed on said movable portion, and wherein the magnetic circuit includes at least a pair of magnets.

17. An optical pick-up as set forth in claim 12, wherein when an optical system block for supporting said support shaft which supports said movable portion is caused to relatively undergo movement in a direction toward the central portion of the disc-shaped optical recording medium or away therefrom, said first object lens moves opposite to a line passing through the center of the disc-shaped optical recording medium and in parallel to a relative movement direction between said optical system block and the disc-shaped optical recording medium.

18. A disc player comprising:

a recording medium holding mechanism for holding a disc-shaped optical recording medium including a transparent base and a signal recording layer;

a biaxial actuator for supporting first and second object lenses on the same movable portion in a state where optical axes of said first and second object lenses are parallel to each other, said biaxial actuator being adapted to oppose said object lenses to the disc-shaped optical recording medium held by said recording medium holding mechanism, and to allow said movable portion to undergo movement to thereby move respective object lenses in an optical axis direction of each of said object lenses and in a direction perpendicular to the optical axis;

a first light source for allowing light beams to be incident to said first object lens via a first optical path;

a second light source for allowing light beams to be incident to said second object lens via a second optical path;

base thickness detecting means for detecting a thickness of the transparent base of the disc-shaped optical recording medium held by said recording medium holding mechanism, and control means for selecting, in accordance with a detection result of the thickness of the transparent base by said base thickness detecting means, whether either said first light source or said second light source is caused to emit light, whereby when the thickness of the transparent base of the disc-shaped optical recording medium held by said recording medium holding mechanism is a thickness in conformity with said first object lens, light beams emitted from said first light source are irradiated onto a signal recording layer of the disc-shaped optical recording medium in a direction substantially perpendicular thereto to converge the light beams on the signal recording layer by said first object lens, while when the thickness of the transparent base of the disc-shaped optical recording medium held by said recording medium holding mechanism is a thickness in conformity with said second object lens, light beams emitted from said second light source are irradiated onto the signal recording layer of the disc-shaped optical recording medium in the direction substantially perpendicular thereto to converge the light beams on the signal recording layer by said second object lens, thus to carry out write or read operation of information signals with respect to the disc-shaped optical recording medium.

19. A disc player as set forth in claim 18, which comprises an optical system block for supporting said biaxial actuator and adapted so that said optical system block is permitted to undergo relative movement with respect to the disc-shaped optical recording medium in a direction toward the central portion of the disc-shaped optical recording medium or away therefrom, whereby when said optical system block is caused to relatively undergo movement operation in the direction toward the central portion of the disc-shaped optical recording medium or away therefrom, said first object lens is moved opposite to a line passing through the center of the disc-shaped optical recording medium and parallel to a relative movement direction between said optical system block and the disc-shaped optical recording medium, and wherein a light diffraction element for branching a light beam incident thereto into a ray of the 0-th order light and rays of at least the ±1-st order light is disposed on the first optical path, thus to obtain, on the basis of light quantity difference of reflected light beams from the disc-shaped optical recording medium of the ±1-st order light, a tracking error signal indicating a deviation quantity in a radial direction of the disc-shaped optical recording medium between a focal point of the 0-th order light by said first object lens and a recording track on the disc-shaped optical recording medium.

20. A disc player as set forth in claim 18, wherein wavelength of rays of light emitted by said first light source is 635 nm to 650 nm, and wavelength of rays of light emitted by said second light source is 780 nm.

21. A disc player as set forth in claim 18, wherein a numerical aperture of said first object lens is 0.6, and a numerical aperture of said second object lens is 0.45 or less.

* * * * *

UNITED STATES PATENT AND TRADEMARK OFFICE
CERTIFICATE OF CORRECTION

PATENT NO.   : 6,172,958 B1
DATED        : January 9, 2001
INVENTOR(S)  : Mochizuki et al.

Page 1 of 1

It is certified that error appears in the above-identified patent and that said Letters Patent is hereby corrected as shown below:

<u>Column 34, claim 13,</u>
Lines 24, should read

13. An optical pickup as set forth in claim 12,
    Wherein the wavelength of light emitted by said first light source is 635 nm to 650 nm, and the wavelength of light emitted by said second light source is 780 nm.

Signed and Sealed this

Eighteenth Day of December, 2001

Attest:

JAMES E. ROGAN
Attesting Officer
Director of the United States Patent and Trademark Office